United States Patent
Guan et al.

(10) Patent No.: US 12,250,737 B2
(45) Date of Patent: Mar. 11, 2025

(54) USER EQUIPMENT PAIRING AND COOPERATIVE MACHINE LEARNING INFERENCE RESULT SHARING

(71) Applicant: QUALCOMM Incorporated, San Diego, CA (US)

(72) Inventors: Kyle Chi Guan, New York, NY (US); Anantharaman Balasubramanian, San Diego, CA (US); Mahmoud Ashour, San Diego, CA (US); Kapil Gulati, Belle Mead, NJ (US); Himaja Kesavareddigari, Bridgewater, NJ (US); Qing Li, Princeton Junction, NJ (US); Hong Cheng, Basking Ridge, NJ (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 17/934,986

(22) Filed: Sep. 23, 2022

(65) Prior Publication Data

US 2024/0107594 A1    Mar. 28, 2024

(51) Int. Cl.
*H04W 24/02*    (2009.01)
*H04W 8/00*    (2009.01)
*H04W 76/10*    (2018.01)

(52) U.S. Cl.
CPC ............ *H04W 76/10* (2018.02); *H04W 8/005* (2013.01); *H04W 24/02* (2013.01)

(58) Field of Classification Search
CPC ...... H04W 76/10; H04W 8/005; H04W 24/02
USPC .......................................................... 370/329
See application file for complete search history.

(56) References Cited

U.S. PATENT DOCUMENTS

2021/0097329 A1*  4/2021  Jia ............................. G06N 3/08
2021/0334444 A1* 10/2021  Lee ............................ G03F 1/36

* cited by examiner

*Primary Examiner* — Christopher R Crompton
(74) *Attorney, Agent, or Firm* — Procopio, Cory, Hargreaves & Savitch LLP/Qualcomm

(57) ABSTRACT

Aspects presented herein may enable a first UE to utilize inference results provided by at least a second UE to improve its inference accuracy. In one aspect, a first UE establishes an ML inference result sharing session with one or more second UEs for at least one ML inference task. The first UE receives a first set of ML inference results associated with the at least one ML inference task, where the first set of ML inference results is received from the one or more second UEs during the ML inference result sharing session. The first UE estimates an aggregated ML inference result based on at least one of the first set of ML inference results or a second set of ML inference results, where the second set of ML inference results is configured by the first UE for the at least one ML inference task.

30 Claims, 20 Drawing Sheets

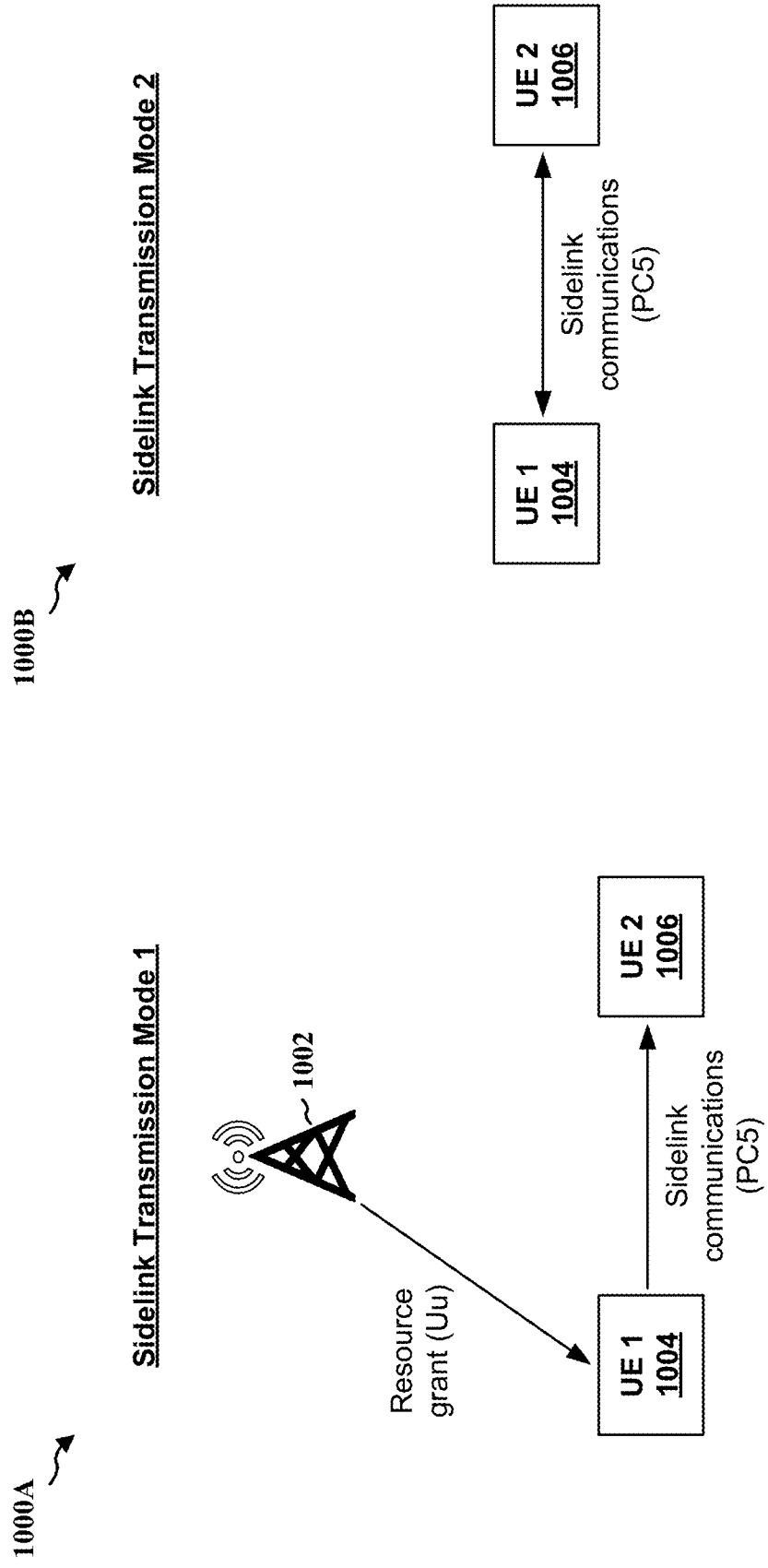

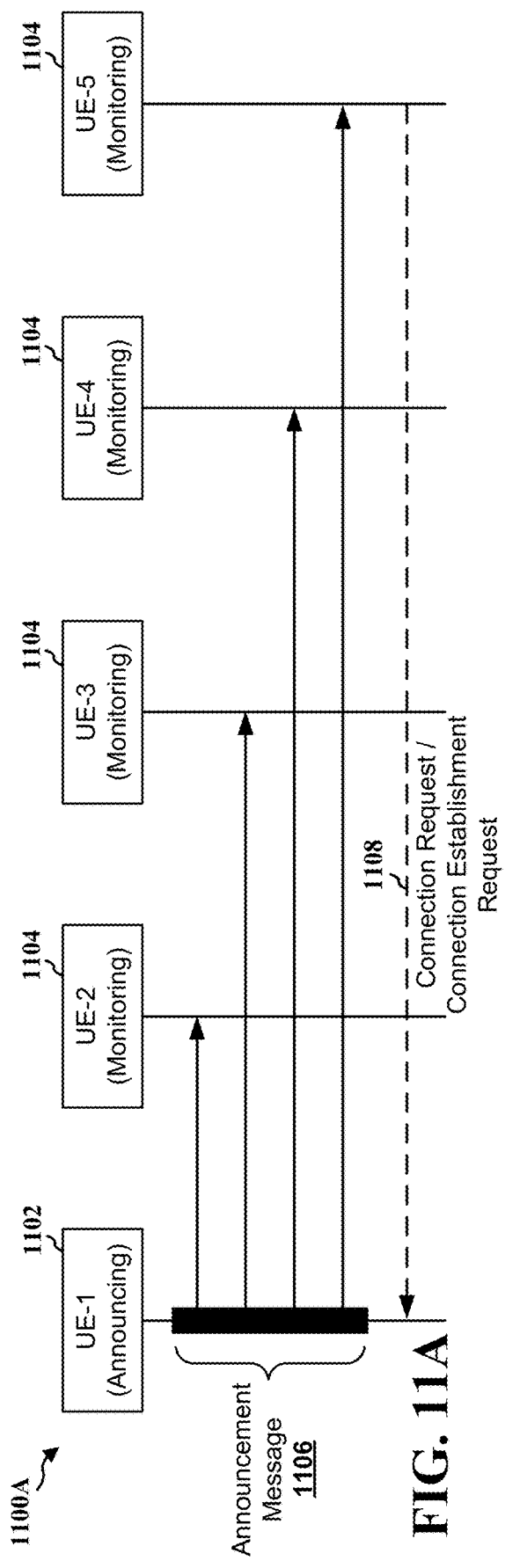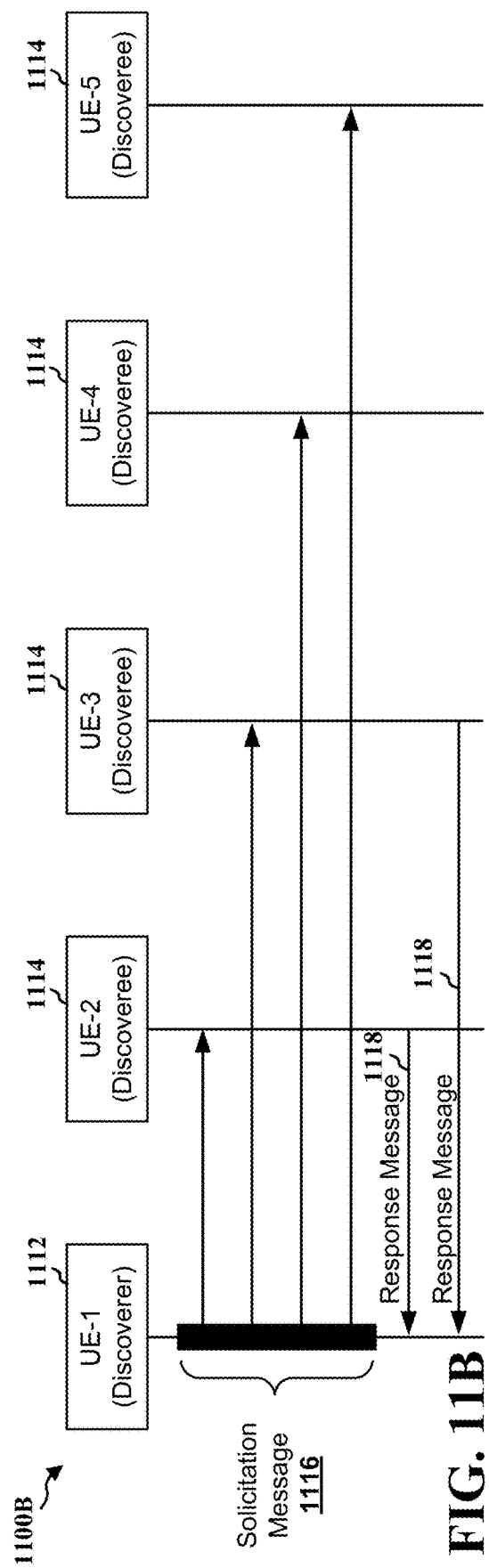

USER EQUIPMENT PAIRING AND COOPERATIVE MACHINE LEARNING INFERENCE RESULT SHARING

TECHNICAL FIELD

The present disclosure relates generally to communication systems, and more particularly, to a wireless communication involving machine learning (ML).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus establishes a machine learning (ML) inference result sharing session with one or more second UEs for at least one ML inference task. The apparatus receives a first set of ML inference results associated with the at least one ML inference task, where the first set of ML inference results is received from the one or more second user equipments (UEs) during the ML inference result sharing session. The apparatus estimates an aggregated ML inference result based on at least one of the first set of ML inference results or a second set of ML inference results, where the second set of ML inference results is configured by the first UE for the at least one ML inference task.

In an aspect of the disclosure, a method, a computer-readable medium, and an apparatus are provided. The apparatus establishes an ML inference result sharing session with a first UE for at least one ML inference task. The apparatus performs ML inferencing for the at least one ML inference task during the ML inference result sharing session. The apparatus transmits, for the first UE, a set of ML inference results obtained from the ML inferencing.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10A is a diagram illustrating an example of a first resource allocation mode for SL in accordance with various aspects of the present disclosure.

FIG. 10B is a diagram illustrating an example of a second resource allocation mode for SL in accordance with various aspects of the present disclosure.

FIG. 11A is a diagram illustrating an example of a first type of SL discovery in accordance with various aspects of the present disclosure.

FIG. 11B is a diagram illustrating an example of a second type of SL discovery in accordance with various aspects of the present disclosure.

DETAILED DESCRIPTION

Figure 1:
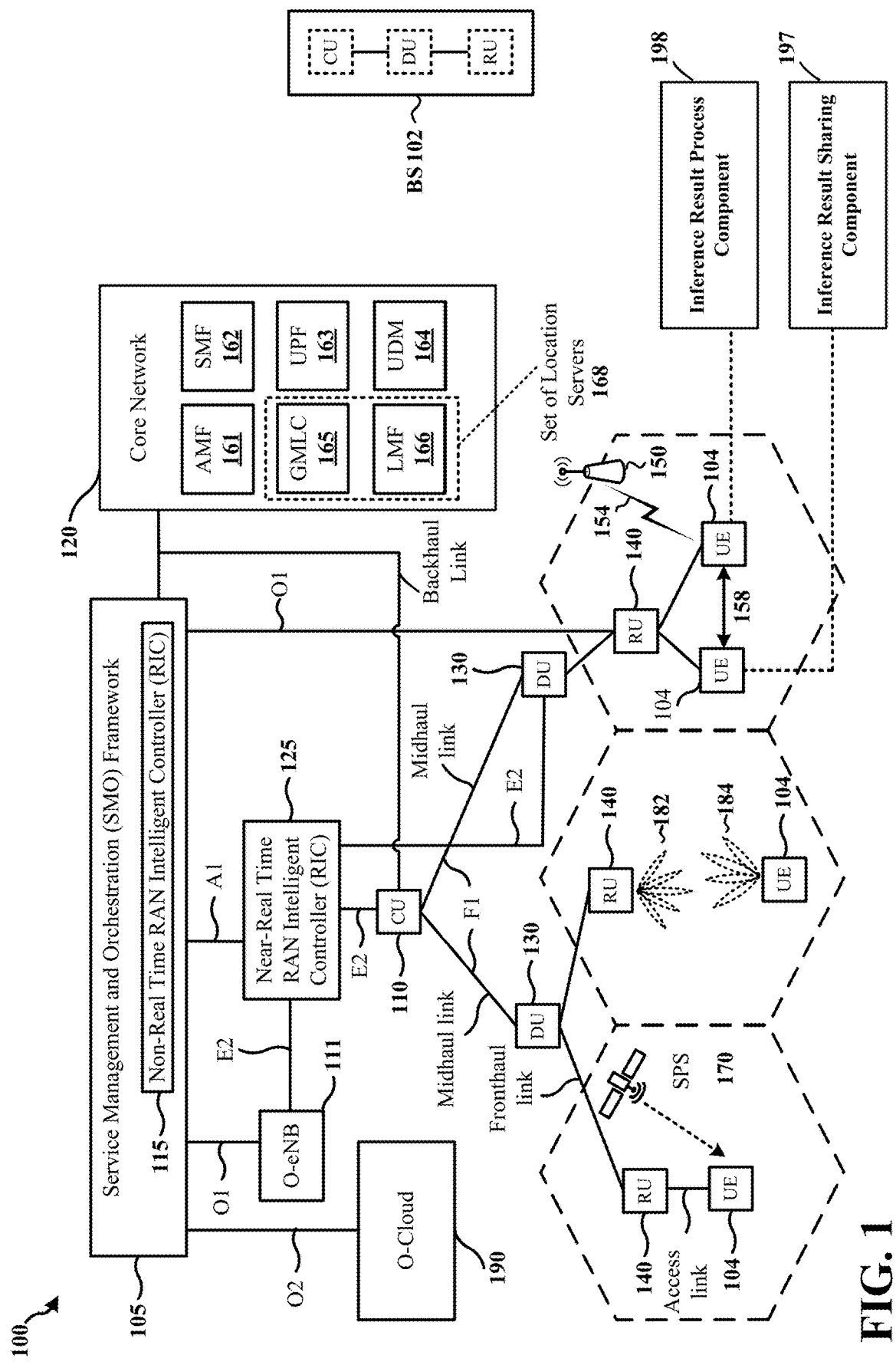
FIG. 1 is a diagram illustrating an example of a wireless communications system and an access network.

Aspects presented herein may improve fusion of inference results from different machine learning (ML) models, such as different ML models associated with different user equipments (UEs). Aspects presented herein may enable a first UE with a less advanced ML model, limited input features, and/or limited UE capabilities to take advantage of (e.g., to utilize) inference results provided by at least a second UE with a more advanced ML model, richer input features, and/or better UE capabilities (e.g., compared to the first UE) via a UE pairing process and an ML inference result sharing process. As UEs may be configured to exchange just inference results, communication overhead between UEs may be significantly reduced, in comparison to other fusion/exchanging approaches such as raw data sharing and/or ML model sharing.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to establish an ML inference result sharing session with one or more second UEs for at least one ML inference task; receive a first set of ML inference results associated with the at least one ML inference task, where the first set of ML inference results is received from the one or more second UEs during the ML inference result sharing session; and estimate an aggregated ML inference result based on at least one of the first set of ML inference results or a second set of ML inference results, where the second set of ML inference results is configured by the first UE for the at least one ML inference task (e.g., via the inference result process component 198).

In certain aspects, the UE 104 may be configured to establish an ML inference result sharing session with a first UE for at least one ML inference task; perform ML inferencing for the at least one ML inference task during the ML inference result sharing session; and transmit, for the first UE, a set of ML inference results obtained from the ML inferencing (e.g., via the inference result sharing component 197).

Figure 2:
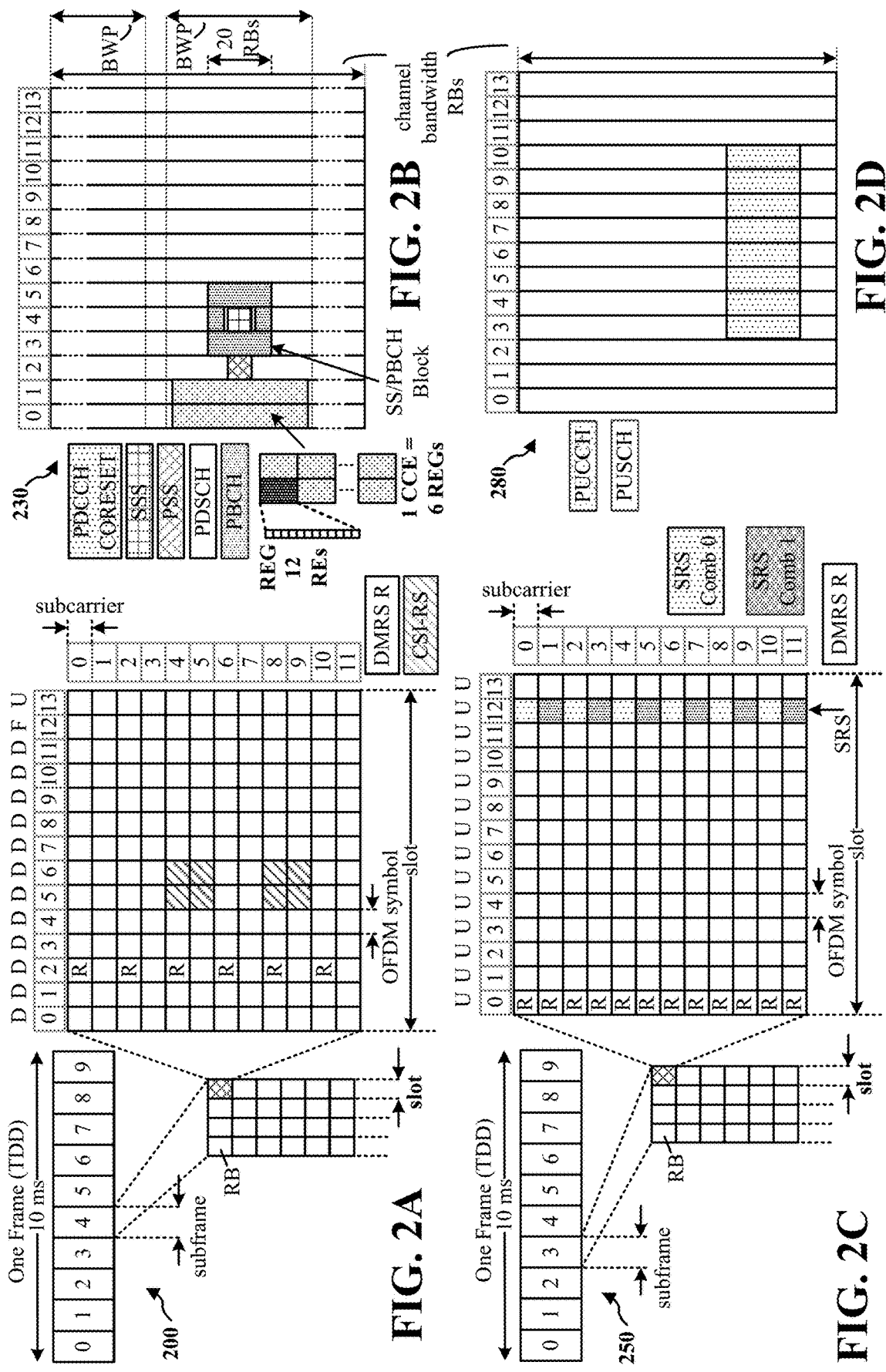
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[\text{kHz}]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
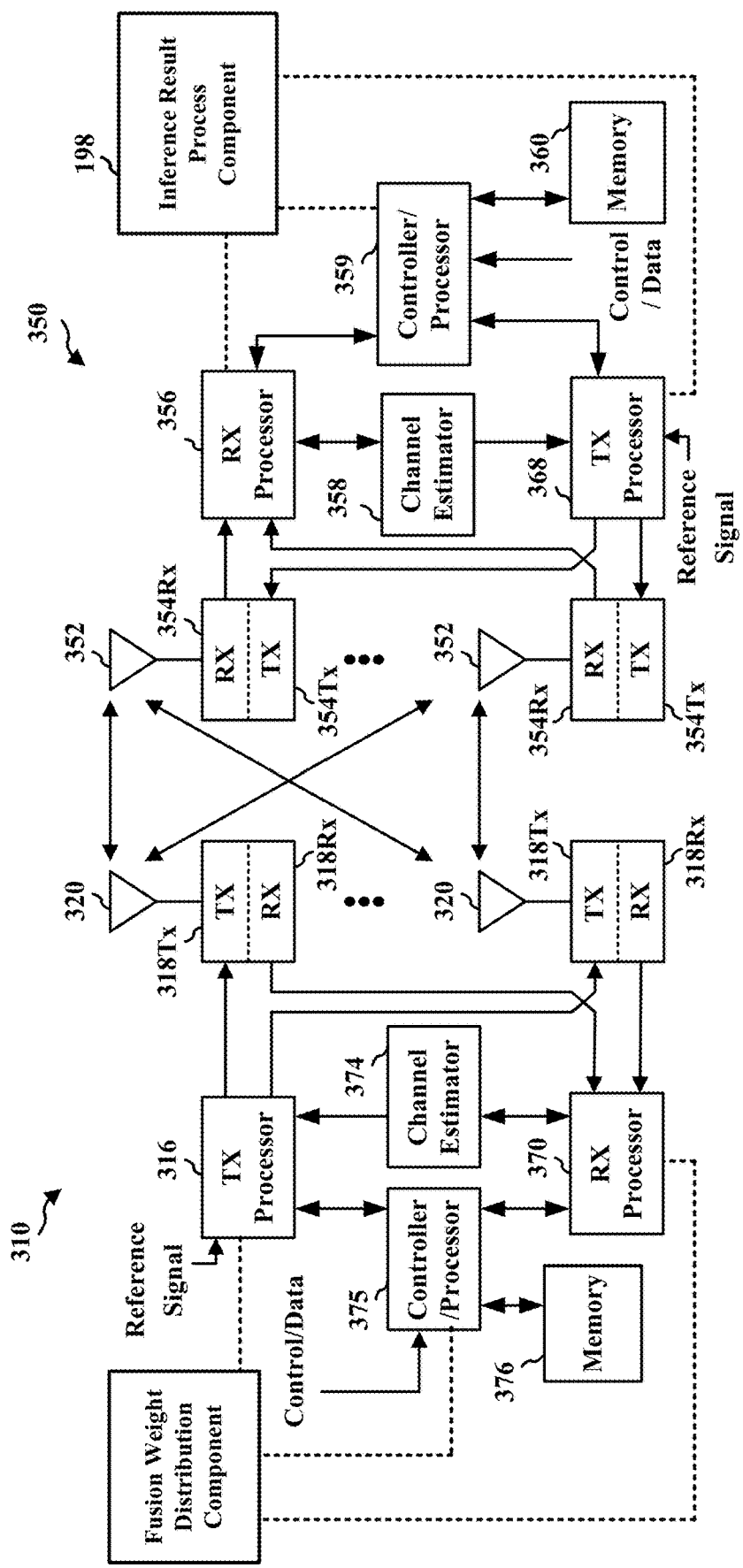
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the inference result process component 198 of FIG. 1.

The speed, bandwidth, latency, and reliability of wireless communications have advanced significantly over last few decades, which also increased the complexity of deploying a wireless network in some instances. To improve management of various network nodes and functions, operators and vendors of wireless communication have started to employ artificial intelligence (AI) and machine learning (ML) to their services and servers. In one example, AI may be broadly defined as configuring computers/electronics devices to perform tasks regarded as uniquely human. ML may be one category of AI techniques, which may include algorithms that are capable of automatically improving their performance without explicit programming.

In some examples, ML algorithms may include supervised learning, unsupervised learning, and/or reinforcement learning. Under the supervised learning, an ML model may specify labelled input and output data during a training phase of the ML model. This training data is often labelled by a data scientist in a corresponding preparation phase, before being used to train and test the ML model. Once the ML model has learned the relationship between the input and output data, the ML model may be used to classify new and unseen datasets and predict outcomes. Under the unsupervised learning, an ML model may be trained based on raw and unlabeled training data, where the ML model is often used to identify patterns and trends in raw datasets, or to cluster similar data into a specific number of groups. Unsupervised machine learning may be more of a hands-off approach compared to the supervised learning, where the ML model may be configured to process huge arrays of data effectively without human oversight. Under the reinforcement learning, an ML model may be trained based on rewarding suitable behaviors and/or punishing unsuitable behaviors. For example, positive values may be assigned to the suitable actions to encourage the ML model and negative values may be assigned to unsuitable behaviors to discourage the ML model. This may enable the ML model to seek a long-term and maximum overall reward to achieve an optimal solution. ML models are often associated with neural networks (NNs), which may also be known as artificial neural networks (ANNs) or simulated neural networks (SNNs). A neural network (NN) may refer to a computer architecture in which a number of processors are interconnected in a manner suggestive of the connections between neurons in a human brain and which is able to learn by a process of trial and error.

For purposes of the present disclosure, an "inference" or an "ML inference" may refer to a process of feeding data points into an ML model (e.g., via an inference host) to calculate an output such as a single numerical score, e.g., to use a trained ML algorithm to make a prediction. An "inference host" or an "ML inference host" may refer to a network function which hosts the trained ML model during an inference mode. The result(s) or output(s) from an ML inference may be referred to as the "ML inference result(s)." On the other hand, a "training" or an "ML training" may refer to a process of running data points to train or teach an ML model (e.g., via a training host). A "training host" or an "ML training host" may refer to a network function which hosts the ML model during a training mode.

Figure 4:
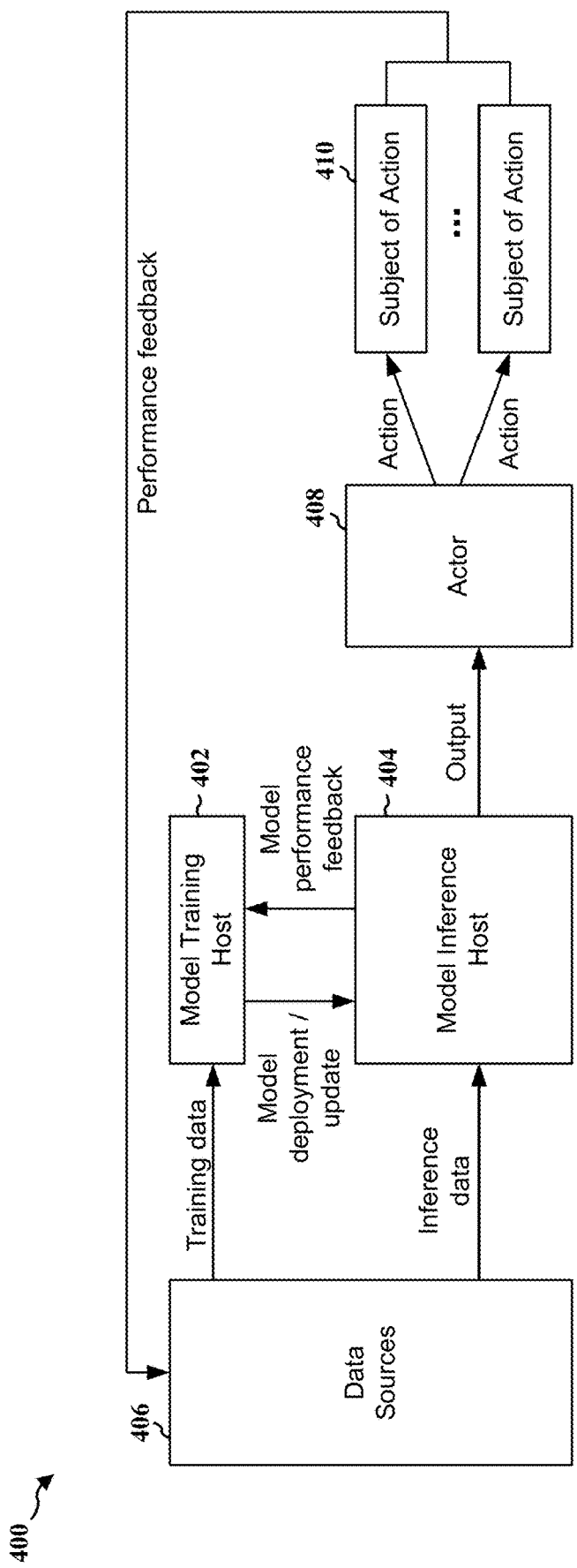
FIG. 4 is a diagram illustrating an example architecture of a functional framework associated with a machine learning (ML) model in accordance with various aspects of the present disclosure.

FIG. 4 is a diagram 400 illustrating an example architecture of a functional framework associated with an ML model in accordance with various aspects of the present disclosure. In some scenarios, the functional frame work for an ML model may be enabled by further enhancement of data collection through uses cases and/or examples. In one example, as shown by the diagram 400, a functional framework for the ML model may include multiple logical entities, such as a model training host 402, a model inference host 404, data sources 406, and/or an actor 408, etc. In some examples, multiple logical entities may be co-located on the same device (e.g., a UE, a positioning device, etc.) or a network node (e.g., a base station, a component of the base station, a server, etc.). In other examples, different logical entities may be located at different devices or network nodes.

The model inference host 404 may be configured to run an ML model based on inference data provided by the data sources 406, and the model inference host 404 may produce an output (e.g., a prediction) with the inference data input to the actor 408. The actor 408 may be a device or an entity. For example, the actor 408 may be a server, a base station, or a UE, etc. In addition, the actor 408 may also depend on the type of tasks performed by the model inference host 404, type of inference data provided to the model inference host 404, and/or type of output produced by the model inference host 404, etc.

After the actor 408 receives an output from the model inference host 404, the actor 408 may determine whether or how to act based on the output. For example, if the actor 408 is a network node (e.g., a base station or a component of a base station) and the output from the model inference host 404 is associated with channel measurement classification, the actor 408 may determine how to classify one or more channel measurements performed based on the output. Then, the actor 408 may indicate the classification to at least one subject of action 410. In some examples, the actor 408 and the at least one subject of action 410 may be the same entity (e.g., the base station or the UE, etc.).

The data sources 406 may also be configured for collecting data that is used as training data for training the ML model or as inference data for feeding an ML model inference operation. For example, the data sources 406 may collect data from one or more UEs, base stations, or servers, which may include the subject of action 410, and provide the collected data to the model training host 402 for ML model training. In some examples, if the output provided by the actor 408 is inaccurate (or the accuracy is below an accuracy threshold), the model training host 402 may determine to modify or retrain the ML model used by the model inference host, such as via an ML model deployment/update.

In some practical ML scenarios, different ML models are often trained and deployed to accomplish the same task, where these ML models may be given different specifications for different applications. These specifications often take the following factors into consideration: the availability of different type of inputs, the specified computational resources, the specified inference times, or a combination thereof. As such, ML models (which may also be referred to as heterogenous ML models or simply heterogenous models) that perform the same ML task (e.g., predict beam blocking probability or detecting bounding box of a vehicle, etc.) may take significantly different features as input and thus have different performance in terms of both accuracy and inference time. For purposes of the present disclosure, a bounding box may refer to a spatial location of an object in an image. For example, a bounding box may be rectangular that is determined by x and y coordinates of the upper-left corner and lower-right corner of the rectangle, respectively. In another example, a bounding box may be represented by x and y coordinates of the bounding box center, and the width and height of the bounding box, etc. In some examples, data annotators may draw these boxes over images, outlining the object of interest within each image by defining its X and Y coordinates.

In one example, to determine/inference whether there is an object (e.g., a pedestrian) on an intersection (e.g., an ML task), a first ML model may be configured to receive images captures by cameras on one or more vehicles around the intersection as inputs, and determine (e.g., provide inference on) whether there is an object on the intersection based on these images. Thus, the first ML model may be specified to have a good image processing capability. On the other hand, a second ML model may be configured to receive radar readings from one or more vehicles (e.g., distance detection between a vehicle and one or more surrounding objects) around the intersection as inputs, and determine whether there is an object on the intersection based on these radar readings. Thus, the second ML model may be specified to have a good processing capability on radar readings. As such, while the first ML model and the second ML model are performing the same ML task, different input(s) and processing capabilities may be specified for the first ML model and the second ML model. In some examples, the inference outputs of different ML models that perform the same task may be fused/combined to achieve an improved performance.

Figure 5:
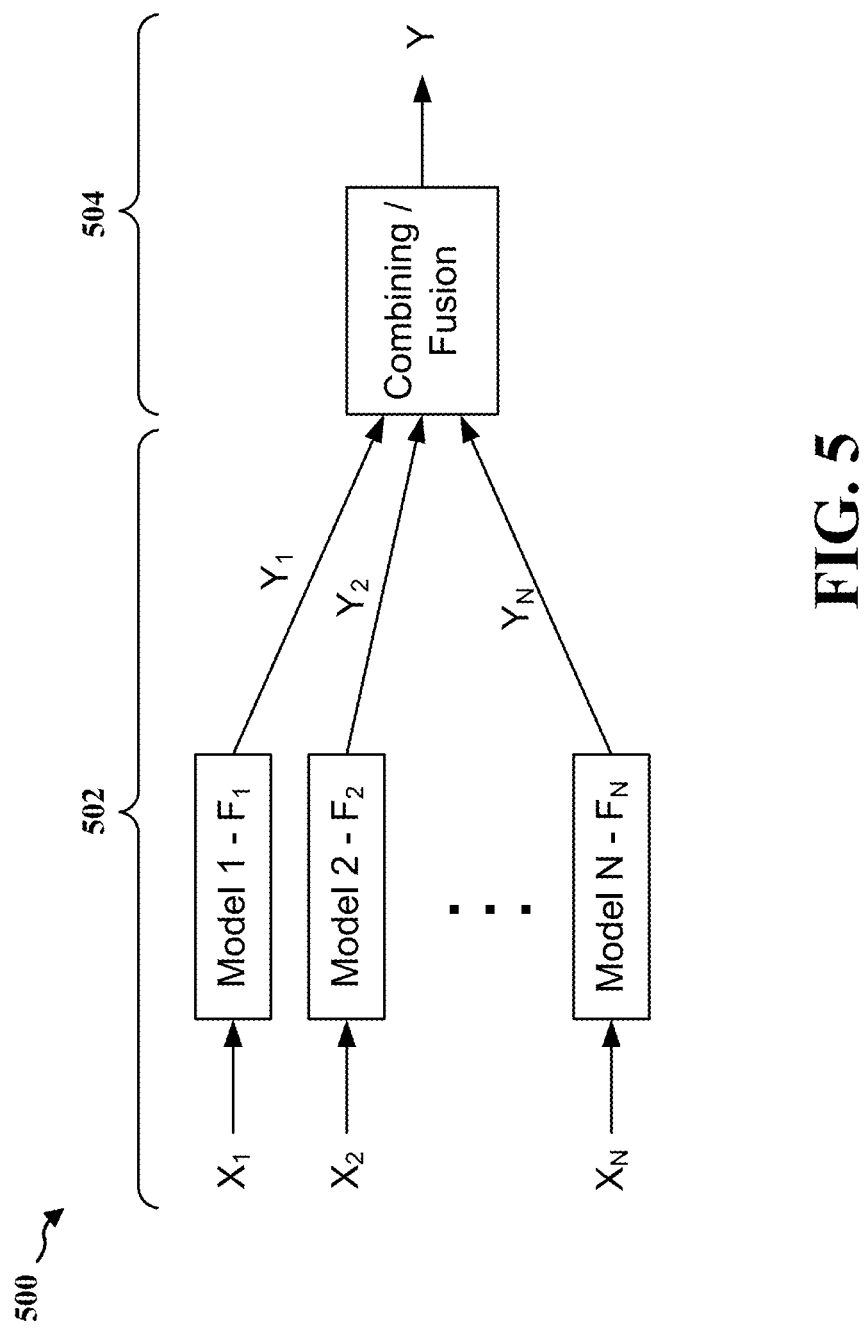
FIG. 5 is a diagram illustrating an example of combining different inference outputs from different ML models to produce a single inference result in accordance with various aspects of the present disclosure.

FIG. 5 is a diagram 500 illustrating an example of combining different inference outputs from different ML models to produce a single inference result in accordance with various aspects of the present disclosure. In one example, as shown at 502, a plurality of ML models (e.g., model 1, model 2, . . . model N) may be configured to perform the same ML task (e.g., determining/inferencing whether there is an object on an intersection), where different ML models may receive different inputs for the ML task. For example, a first ML model (model 1) may receive a first type of inputs ($X_1$) (e.g., images captured by one or more vehicles) to provide a first inference ($Y_1$) for the ML task (e.g., the determination of whether there is an object on the intersection), a second ML model (model 2) may receive a second type of inputs ($X_2$) (e.g., radar readings from one or more vehicles) to provide a second inference ($Y^2$) for the ML task, and a $N^{th}$ ML model (model N) may receive a $N^{th}$ type of inputs ($X_N$) (e.g., images captured by one or more vehicles) to provide a $N^{th}$ inference ($Y_N$) for the ML task, etc.

Then, as shown at 504, the inference results $Y_1$, $Y_2$, . . . , $Y_N$ produced by the plurality of ML models may be combined and fused to a single inference result Y. Combination/fusion of inference results may generally fall into two categories: averaging and voting. Averaging may apply to numerical outputs/regression tasks, e.g., simple averaging or weighted averaging. For example, each of the plurality of ML models may be configured to produce a score (e.g., between 1 and 100) as the inference result that indicates the likelihood of an object being on the intersection (e.g., 1 being unlikely and 100 being very likely). Then, a fusion engine/entity (or another ML model) may combine/fuse scores from the plurality of ML models to produce a final determination/inference based on the average of the scores. For example, the fusion engine/entity may be configured to determine that there is an object on the intersection if the average score is above 60, and determine that there is no object on the intersection if the average score is below 60, etc.

Voting may apply to categorical outputs/classification tasks, e.g., majority voting, plurality voting, weighted voting, and soft voting. For example, each of the plurality of ML models may be configured to determine/inference whether there is an object on the intersection (e.g., either yes or no). Then, a fusion engine/entity (or another ML model) may combine/fuse the determinations from the plurality of ML models to produce a final determination/inference based on which determination has the majority. For example, the fusion engine/entity may determine that there is an object on the intersection if there are more ML models in the plurality of ML models determining there is an object on the intersection, and the fusion engine/entity may determine that there is no object on the intersection if there are more ML models in the plurality of ML models determining there is no object on the intersection, etc.

In some examples, combination mechanisms/methods for more complex inference results (e.g., object detection bounding box) may be more involved and specify a lot of meta information with regards to both sensors and ML models. Meta information may refer to information about information. For example, if a document is considered to be information, its title, location, and subject may be examples of meta information. Similarly, metadata may refer to data that provides information about other data, but not the content of the data. For example, fuse detection bounding boxes (of the same object) provided by different cameras may specify a set of UEs to share or agree upon in the pairing and the ML inference result sharing session establishment process (discussed in details below) regarding: the common coordinate system (e.g., world-XYZ coordinate based on a three dimensional mapping/model, or image-UV coordinate based on a two dimensional mapping/model, etc.), camera senor's global positioning system (GPS) coordinates, camera sensor configuration (e.g., field of view, resolution, etc.), and/or meta information of the detection ML models, etc.

Aspects presented herein may improve fusion of inference results from different ML models, such as different ML models associated with different UEs. Aspects presented herein may enable a UE with a less advanced ML model, limited input features, and/or limited UE capabilities to take advantage of (e.g., to utilize) inference results provided by other UE(s) with more advanced ML model(s) (compared to the UE), richer input features, and/or better UE capabilities via a device pairing process and an inference result sharing mechanism. In one aspect, as UEs may be configured to exchange just inference results, communication overhead between UEs may be significantly reduced, in comparison to other fusion approaches such as sensor sharing (e.g., exchanging raw data, such as captured images, radar readings, etc.) and model sharing (exchanging trained weights of ML models), such as illustrated by Table 2 below.

TABLE 2

Overhead comparison between different types of sharing

| Type of Sharing | Information Shared | Overhead |
| --- | --- | --- |
| Sensor sharing | Sensor input, raw data, and/or features | High |
| Model sharing | ML model | High |
| Inference result sharing | Inference results | Low |

As such, inference result sharing may be suitable for a communication with specifies low overhead and/or low latency. For example, it may be suitable for vehicle related communications which may specify low latency, such as for vehicle-to-everything (V2X) entities (e.g., road side units (RSUs), vehicles, vulnerable road users (VRUs), etc.) to describe detected road users, road obstacles, and/or road impairments. V2X may refer to a communication between a vehicle and any entity that may affect, or may be affected by, the vehicle.

Figure 6:
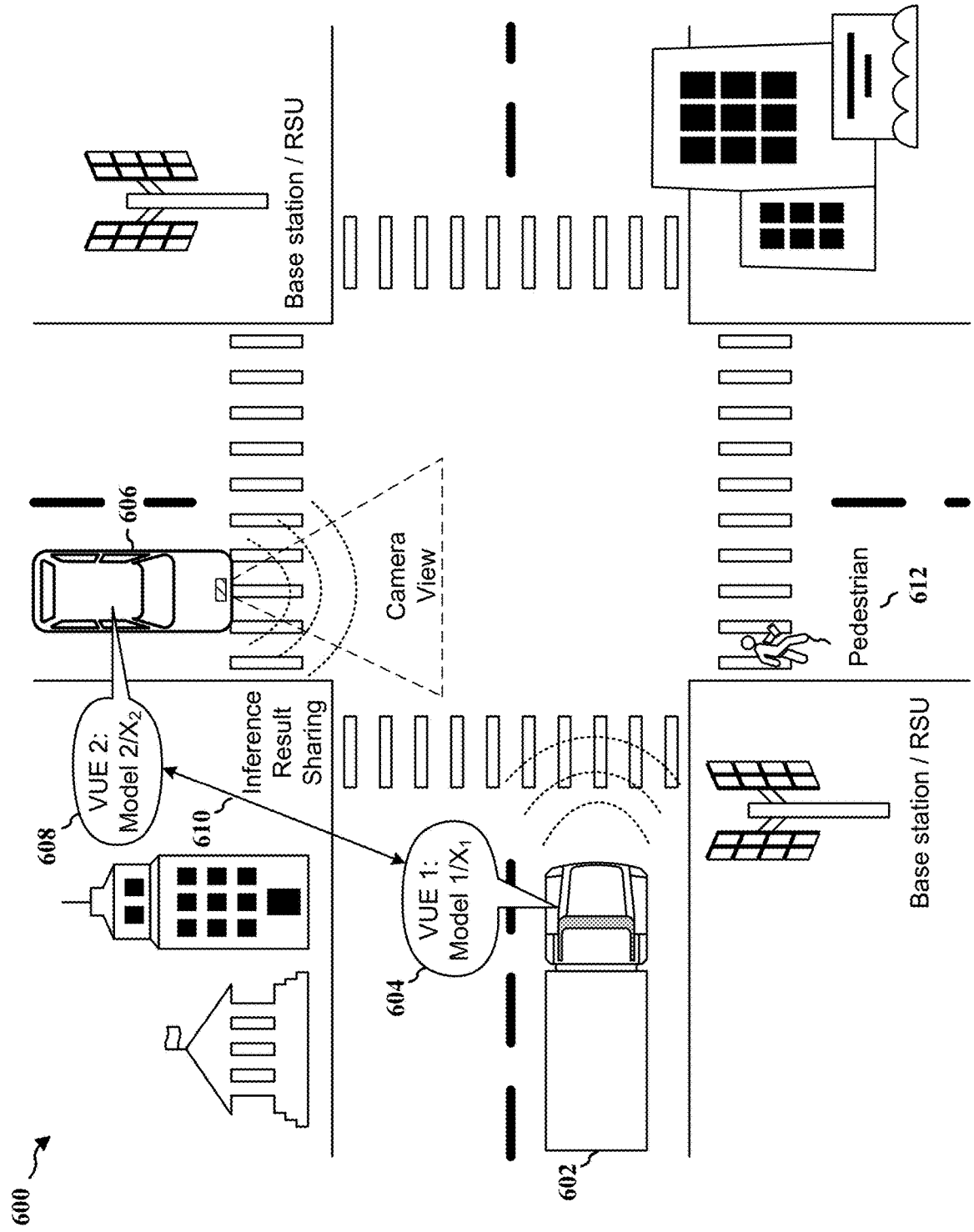
FIG. 6 is a diagram illustrating an example scenario of ML inference result sharing based on UE paring over sidelink (SL) in accordance with various aspects of the present disclosure.

FIG. 6 is a diagram 600 illustrating an example scenario of ML inference result sharing based on UE paring over sidelink (SL) in accordance with various aspects of the present disclosure. In on example, in the context for V2X and SL, the pairing, de-pairing, and/or re-pairing of UEs may happen frequently due to the mobility of the UEs. For purposes of the present disclosure, a UE that is used in association with a vehicle may be referred to as a vehicle UE or a VUE, whereas a UE that is used in association with a pedestrian may be referred to as a pedestrian UE. As such, sharing just inference results may significantly reduce the communication overhead and thus the mechanism may be more practical compared to other sharing/fusion approaches such as sensor sharing and/or ML model sharing.

For example, as shown by the diagram 600, a first vehicle 602 and a second vehicle 606 may be approaching a same intersection (e.g., based on autonomous driving), where the first vehicle 602 may be associated with a first VUE 604 that is running a first ML model (model 1) and receiving a first type of inputs ($X_1$) and the second vehicle 606 may be associated with a second VUE 608 that is running a second ML model (model 2) and receiving a second type of inputs ($X_2$). Both the first ML model and the second ML model may be configured to detect whether there are objects or people at the intersection, such as described in connection with FIG. 5.

In one example, the first VUE 604 may be capable of performing just radio frequency (RF) sensing (e.g., detection of one or more objects based on RF signals), and the first VUE 604 may have a relatively simple ML model for detecting the presence of any objects or pedestrians. On the other hand, the second VUE 608 may be equipped with cameras and light detection and ranging (LIDAR) sensors in addition to its RF sensing capability, and the second ML model running on the second VUE 608 may also have a better performance compared to the first ML model running on the first VUE 604. Additionally or alternatively, the second VUE 608 may detect an object out of the sensing view of the first VUE 604, or vice versa (e.g., a pedestrian 612).

As shown at 610, by enabling the first VUE 604 and the second VUE 608 to pair with each other (e.g., over a sidelink), the second VUE 608 may share its inference results (e.g., determination of whether there are objects/pedestrians on the intersection) with the first VUE 604. Then, the first VUE 604 may combine the inference results received from the second VUE 608 with its own inference results (e.g., based on the fusion mechanism discussed in connection with FIG. 5) to improve the detection accuracy of the first VUE 604. In another example, the first VUE 604 may also utilize the inference results from the second VUE 608 without using its own inference results. Similarly, the first VUE 604 may also share its inference results with the second VUE 608, and the second VUE 608 may also combine the inference results received from the first VUE 604 with its own inference results, etc. However, the second VUE 608 may also be configured to use its own inference results (e.g., does not use the inference results form the first VUE 604).

Figure 7:
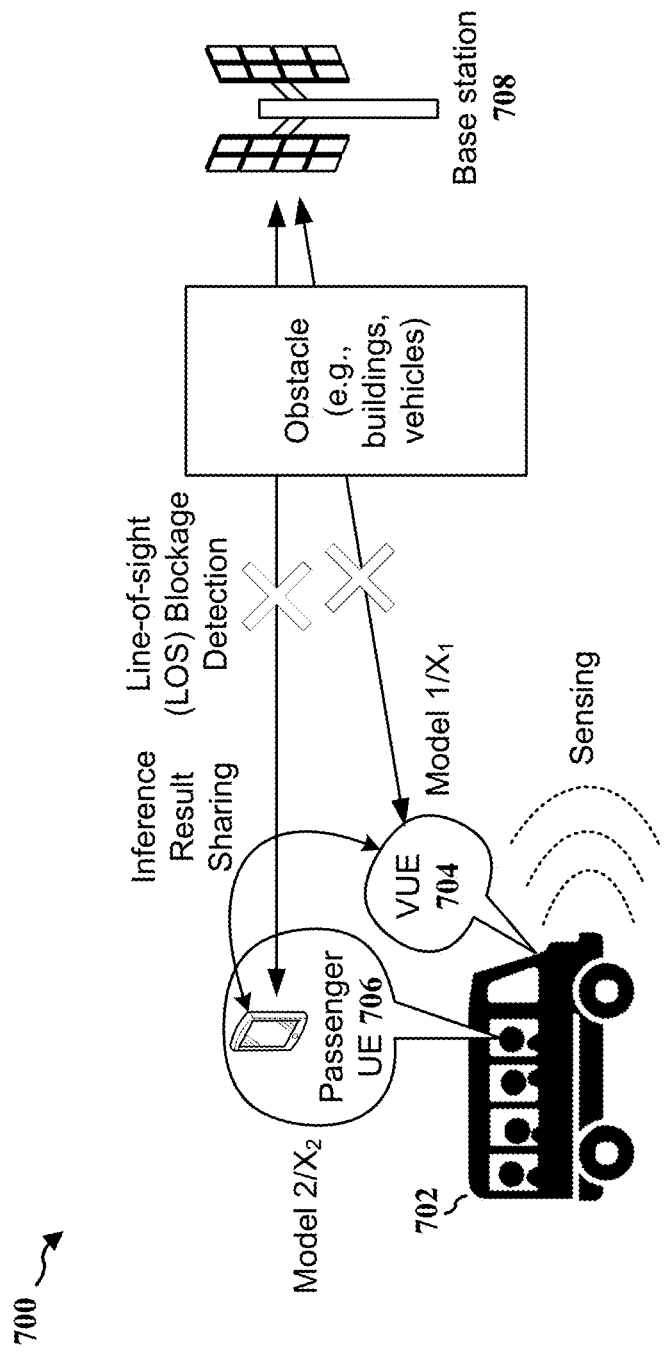
FIG. 7 is a diagram illustrating an example scenario of ML inference result sharing between a vehicle UE (VUE) on a vehicle and a UE used by a user (a passenger UE) on the same vehicle in accordance with various aspects of the present disclosure.

FIG. 7 is a diagram 700 illustrating an example scenario of ML inference result sharing between a VUE on a vehicle and a UE used by a user on the same vehicle in accordance with various aspects of the present disclosure. A vehicle 702 may be associated with a VUE 704 that is running a first ML model (model 1) and receiving a first type of inputs ($X_1$), and a passenger on the vehicle 702 may be using a UE (which may be referred to as a passenger UE 706) that is running a second ML model (model 2) and receiving a second type of inputs ($X_2$). Both the first ML model and the second ML model may be configured to detect whether there is a potential line-of-sight (LOS) blockage (e.g., by an obstacle such as a building or other incoming vehicle(s)) between a base station 708 and the VUE 704/passenger UE 706. The passenger UE 706 may have a very limited sensing capability compared to the VUE 704, and the second ML model running on the passenger UE 706 may also be a simple ML model. In comparison, the VUE 704 may be equipped with a set of vision sensors, such as camera(s), radar(s), and LIDAR, etc. In addition, the VUE 704's onboard computer may be capable of handling a more advanced ML model. In one example, via the pairing between the passenger UE 706 and the VUE 704, the passenger UE 706 may receive inference results produced by the VUE 704 (e.g., via the first ML model), and the passenger UE 706 may combine the inference results with its own inference results to improve its own prediction accuracy for the LOS blockage, such as described in connection with FIGS. 5 and 6.

Figure 8:
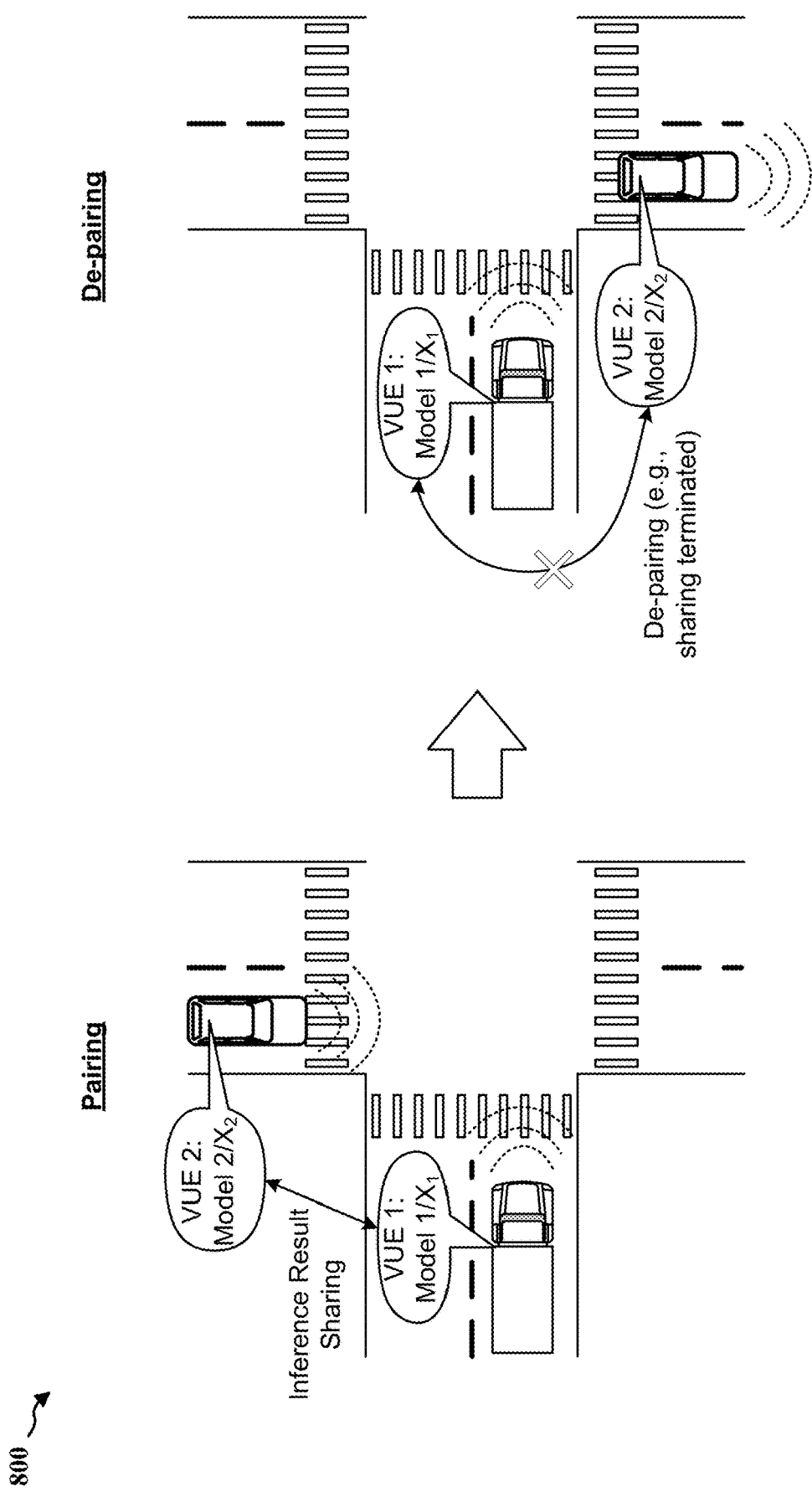
FIG. 8 is a diagram illustrating an example of UEs de-pairing after ML inference result sharing in accordance with various aspects of the present disclosure.

As shown by the example scenarios described in connection with FIGS. 6 and 7, aspects presented herein may avoid the UEs to share the ML models and/or raw data (e.g., for performing inference), where a UE may be configured to fuse the ML inference from one or more other UEs to improve the accuracy of its inferencing. Thus, signaling overhead between UEs may be reduced, and better data privacy may also be achieved (e.g., inference results are shared instead of raw data that may include confidential/proprietary information). In addition, as shown by a diagram 800 of FIG. 8, after two UEs are paired (e.g., as described in connection with FIGS. 6 and 7), aspects presented herein may also enable these two UEs to continue using their own ML models after they de-pair (e.g., after inference result sharing is terminated). As such, there may be less frequent ML model updates specified in a dynamic environment where UE pairing and de-pairing may happen at a higher frequency due to mobilities of a UE.

As illustrated in previous examples, a UE with a less advanced ML model or limited features (e.g., the first VUE 604 on FIG. 6 and the passenger UE 706 on FIG. 7) may improve its inference/prediction/detection accuracy by taking advantage of inference results provided by other UEs (e.g., the second VUE 608 on FIG. 6 and the VUE 704 on FIG. 7) with more advanced ML model(s) and richer feature(s), such as via a pairing and sharing process. To leverage better sensing capability and ML inference model of one UE on another UE, aspects presented herein also provide a discovery and pairing process that enables a first UE to discover at least a second UE that is equipped with an ML model that performs the same ML task as the ML model on the first UE and has richer input features and/or better performance. Aspects presented herein also provides a pairing process between two UEs after a discovery procure, and a process of establish an ML inference result sharing session after the completion of the discovery procedure and the pairing process, such that the UEs may exchange ML inference results during the ML inference result sharing session. Aspects presented herein may also enable a network entity (e.g., a base station or a server) to assist in the fusion/combination of inference results from different UEs and ML models, which may be referred to as network-assisted ML inference result combination.

Figure 9:
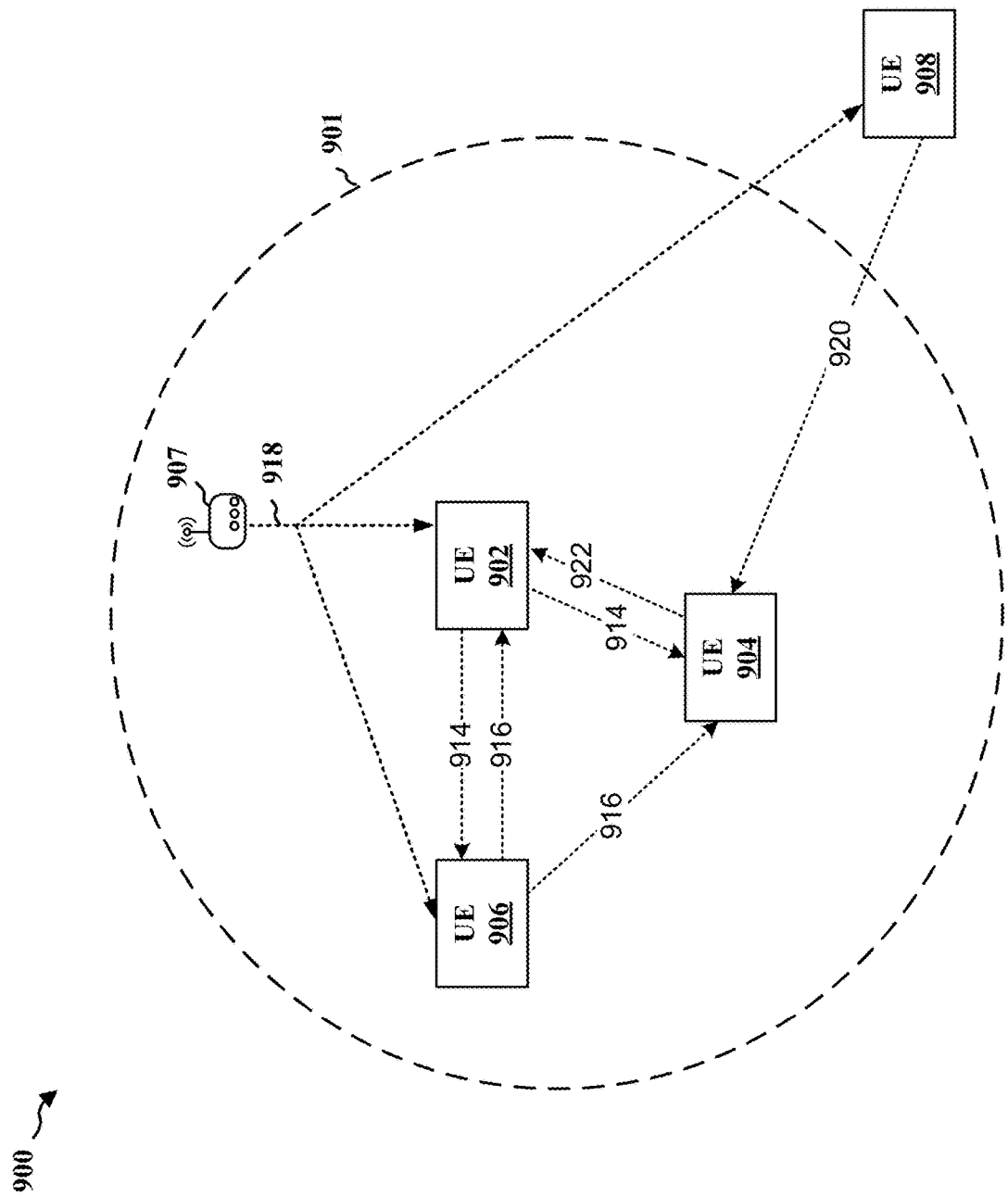
FIG. 9 is a diagram illustrating an example of wireless communication between UEs based on SL in accordance with various aspects of the present disclosure.

FIG. 9 is a diagram 900 illustrating an example of wireless communication between UEs based on sidelink (SL) in accordance with various aspects of the present disclosure. In some scenarios, UEs may communicate with each other over an SL channel (e.g., without going through a base station or a network entity). For example, a UE 902 may transmit an SL transmission 914, e.g., including a control channel (e.g., a physical sidelink control channel (PSCCH)) and a corresponding data channel (e.g., a physical sidelink shared channel (PSSCH)), that may be received by one or more UEs (e.g., UEs 904 and 906). A control channel may include information for decoding the corresponding data channel, and it may also be used by a receiving UE for avoiding interference (e.g., UEs 904 and 906 may be refrained from transmitting data on resources occupied/reserved by the UE 902). For example, the UE 902 may indicate the number of transmission time intervals (TTIs) and the resource blocks (RBs) that are to be occupied by an SL transmission from the UE 902 in a control message (e.g., a sidelink control information (SCI) message). The UEs 902, 904, 906, and 908 may each have the capability to operate as a transmitting UE in addition to operating as a receiving UE. For example, UEs 904, 906, and 908 may also transmit SL transmissions 922, 916, and 920, respectively, to other UEs, such as the UEs 902 and 904. The SL transmissions 914, 916, 920 may be broadcast or multicast to nearby wireless devices or UEs. For example, the UE 902 may transmit SL transmissions for receipt by other UEs within a range 901 of the UE 902. Additionally, or alternatively, a road side unit (RSU) 907 may be used to provide connectivity and information to sidelink UEs, such as by receiving SL transmissions from and/or transmitting SL transmissions 918 to UEs 902, 906, and 908.

An SL communication that is exchanged directly between UEs (which may be referred to as "sidelink UEs" hereafter) may include discovery messages for a UE to find other nearby UEs. In some examples, the SL communication may also include resource reservation information associated with other sidelink UEs, which may be used by a UE for determining/selecting the resources for an SL transmission. In one example, a sidelink communication may be based on different types or modes of resource allocation mechanisms. As shown by a diagram 1000A of FIG. 10A, in resource allocation mode 1 (which may be referred to as "Mode 1"), a centralized resource allocation may be provided. For example, under the resource allocation mode 1, a base station 1002 may determine and allocate sidelink resources for communications between a first UE 1004 and a second UE 1006. The first UE 1004 may receive an indication of the allocated sidelink resources (e.g., a resource grant) from the base station 1002 via a UE-to-universal mobile telecommunications system (UMTS) terrestrial radio access network (UE-to-UTRAN) (Uu) link (e.g., via a resource radio control (RRC) message or downlink control information (DCI) (e.g., DCI format 3_0)), and then the first UE 1004 may use the allocated sidelink resources for communicating with the second UE 1006 over the sidelink (which may also be referred to as a PC5 link).

As shown by a diagram 1000B of FIG. 10B, in resource allocation mode 2 (which may be referred to as "Mode 2"), a distributed resource allocation may be provided between UEs. For example, under the resource allocation mode 2, each UE may autonomously determine sidelink resources for its sidelink transmission. To coordinate the selection of sidelink resources by individual UEs, each UE may use a sensing technique to monitor/detect sidelink resources reserved/used by other UEs, and then each UE may select sidelink resources for its sidelink transmissions from unreserved/used sidelink resources. For example, a first UE 1004 may sense and select unreserved/unused sidelink resources in a sidelink resource pool based on decoding SCI messages received (e.g., transmitted from a second UE 1006 or another UE), and the first UE 1004 may use the selected side resources for communicating with the second UE 1006. After the first UE 1004 selects the sidelink resources for its transmission, the first UE 1004 may also transmit/broadcast (e.g., via broadcast) to other UEs the sidelink resources used/reserved by the first UE 1004 via SCI, such that other UEs may refrain using these sidelink resources to avoid resource collision (e.g., two UEs transmitting simultaneously using same time and frequency resources). Signaling on sidelink may be the same between the two resource allocation modes (e.g., Mode 1 and Mode 2). For example, from a receiving UE's point of view (e.g., the second UE 1006), there may be no difference between the two resource allocation modes.

As discussed, sidelink UEs may exchange direct sidelink communication with each other. To establish a sidelink communication between sidelink UEs, one sidelink UE may attempt to discover another sidelink UE via a discovery procedure. In one type of sidelink discovery model, as shown by a diagram 1100A of FIG. 11A, to determine the presence of another UE over sidelink, a first UE 1102 may broadcast/groupcast a discovery message. The discovery message may be an announcement message 1106. The first UE 1102 may broadcast the announcement message 1106 indicating its presence as a sidelink UE to other UEs (e.g., UE(s) 1104) within a transmission range of the first UE 1102. In response, the UE(s) 1104 may transmit a connection request message 1108 (which may also be referred to as a "connection establishment request message") to the first UE 1102 if they want to establish a sidelink communication with the first UE 1102. For example, referring back to FIG. 9, the UE 902 may broadcast an announcement message that may be received by the UEs 904 and 906, and other sidelink UEs such as the RSU 907, within the range 901 (e.g., a transmission range) of the UE 902. A sidelink UE, such as UE 904, that receives the announcement message may respond with a message (e.g., a connection request) to the UE 902. After discovering each other, the UEs 902 and 904 may exchange sidelink communications with each other. In some examples, a UE (e.g., UE 902, first UE 1102) that transmits the announcement message (e.g., the announcement message 1106) may be referred to as an announcing UE. A UE (e.g., the UE(s) 1104) that transmits the discovery response or monitoring for the announcement message may be referred to as a monitoring UE. The type of discovery involving a broadcast announcement and reply may be referred to as a first model of discovery, or "Model A" sidelink discovery.

In another type of sidelink discovery model, as shown by diagram 1100B of FIG. 11B, a first UE 1112 (e.g., UE 402) may broadcast a solicitation message 1116 (which may also be referred to as a "discovery request message") to one or more UE(s) 1114. The first UE 1112 transmitting the solicitation message 1116 may be referred to as a discoverer UE. In response, the UE(s) 1114 receiving the solicitation message 1116 may process the request and transmit a response message 1118 to the first UE 1112. The UE(s) 1114 transmitting the response message 1118 may be referred to as a discoveree UE. The type of discovery including a solicitation message or a discovery request message may be referred to as a second type of discovery or "Model B" sidelink discovery.

Figure 12A:
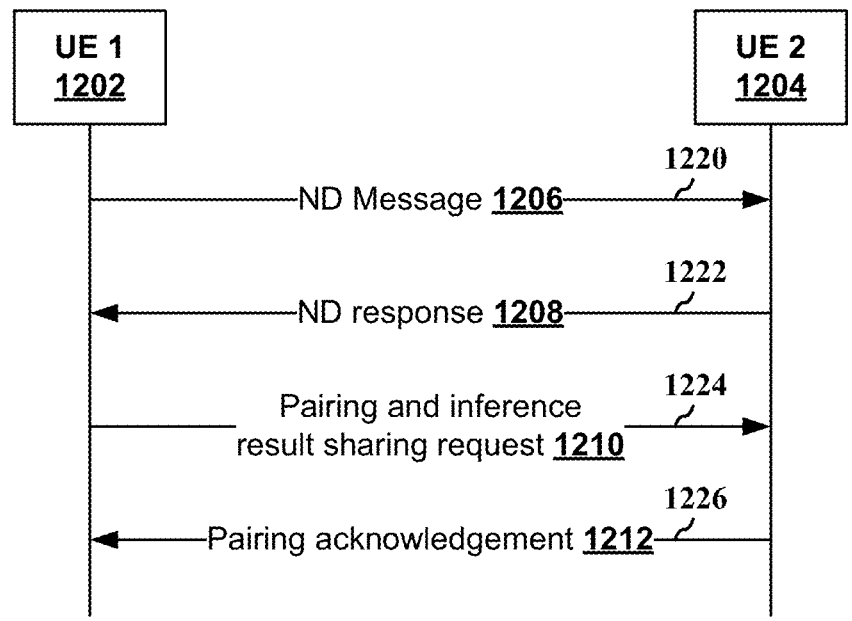
FIG. 12A is a communication flow illustrating an example discovery and UE pairing process based on a first mode in accordance with various aspects of the present disclosure.

FIG. 12A is a communication flow 1200A illustrating an example discovery and UE pairing process based on a first mode (e.g., Mode 1) in accordance with various aspects of the present disclosure. The numberings associated with the communication flow 1200A do not specify a particular temporal order and are merely used as references for the communication flow 1200A. Aspects presented herein may enable a first UE to send probing requests to its neighboring UEs (e.g., at least a second UE) to response during a UE-to-UE direct device discovery process, such as described in connection with FIG. 11B. For example, the first UE may broadcast a probing request (to discover) to one or more neighboring UEs to respond for potential pairing for inference result exchange.

At 1220, a first UE 1202 (e.g., a discoverer) may broadcast a neighbor discovery (ND) message 1206 for an ML inference service discovery, where the ND message 1206 may be broadcasted to and received by one or more neighboring UEs, which may include at least a second UE 1204. In some examples, while an ND message may include fields that are used in other types of discovery message(s), such as those used in an Internet Protocol version 6 (IPv6) neighbor discovery message (e.g., type, checksum, flag, UE IP address, UE Mac address, etc.), the ND message 1206 described herein may be configured to include fields that are related to the inference tasks and capabilities of neighboring nodes. For example, to collaboratively share the ML inference results for detecting pedestrians/objects at an intersection and/or at crosswalks, the ND message 1206 may include one or more of the following parameters/specifications for the ML inference service (e.g., ML inference service to be provided by the second UE 1204):

(1) At least one ML task to be performed (e.g., detecting the presence of pedestrians at the intersections and/or determining whether there is a LOS blockage, etc.).

(2) Meta information of the input for each related ML models (e.g., ML model(s) that are participating the ML inference result sharing session). In one example, the meta information may include: modality of the input (e.g., images, radar related measurement/information, or reference signal received power (RSRP), etc.) and/or format of input (e.g., image size as represented by a three-dimensional (3D) array, such as 128×128×3, etc.).

(3) Meta information of the related ML models, which may include: ML model name (e.g., YOLO) and version (e.g., YOLOv3), sensor input (e.g., camera), purpose(s) (e.g., for producing object detection bounding boxes (OBBs). In some examples, the metal information of the related ML models may also include ML model architecture such as a set of parameters associated with neural network (NN) layers. The set of parameters associated with the NN layers may include layer parameters, type of the layer (e.g., a convolution layer, a fully connected layer, a pooling layer, a dropout layer, an activation layer, etc.), size of the layer (e.g., for a fully connected layer), and/or kernel for the convolutional layer, including kernel size (e.g., 3×3), stride size (e.g., 2), with or without padding, number of channels, or a combination thereof.

(4) Meta information to be used for inference fusion (e.g., for bounding boxes detection), which may include coordinate system used (e.g., world-XYZ coordinate and image-UV coordinate, etc.) and/or camera sensor's GPS coordinates, etc.

(5) Inference output format(s) of the related ML models (e.g., probability of detecting an event, a score, a yes/no indication, etc.).

(6) Inference performances of the related ML models (e.g., detection accuracy and the meta information of the test dataset).

(7) Duration of the inference service in which the second UE 1204 is capable of providing (or plan to provide) (e.g., five (5) seconds starting at time X).

(8) Life span and/or updating period for the related ML models.

At 1222, after receiving the broadcasted ND message 1206 form the first UE 1202, the second UE 1204 may send an ND response 1208 back to the first UE 1202 that indicates information associated with its ML inference data service. For example, the information associated with its ML inference data service may include: an ML inference data service ID, meta information of the features for each related ML inference models, meta information of the related ML inference models, meta information related to inference result fusion, inference output formats of the related inference ML models, inference performances of the related ML models, duration of the inference service that the second UE 1204 plans to provide for the related ML models, or a combination thereof.

At 1224, based on the ND response 1208, the first UE 1202 may send a pairing and inference result sharing request 1210 to the second UE 1204. In some examples, the first UE 1202 may receive multiple ND responses (e.g., from multiple neighboring UEs). In such scenarios, the first UE 1202 may be configured to select a best (e.g., a most suitable) UE among the multiple neighboring UEs for the pairing, where the selection may be based on predefined or configured selection criteria (e.g., UE location or distance, channel condition or link quality, UE capability, etc.), and/or based on the ML inference data service information provided by each of the multiple neighboring UEs.

At 1226, after receiving the pairing and inference result sharing request 1210, the second UE 1204 may send a pairing acknowledgement 1212 back to the first UE 1202. Then, the first UE 1202 may be successfully paired to the second UE 1204.

Figure 12B:
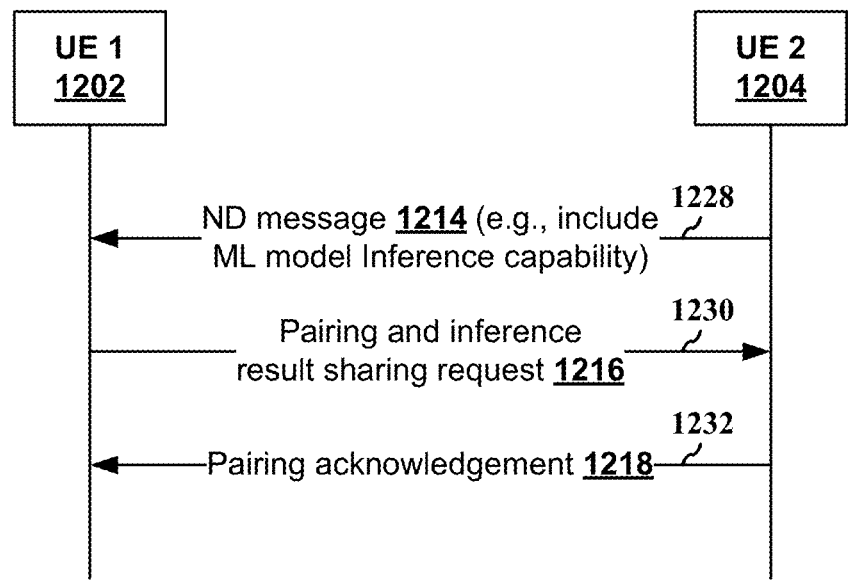
FIG. 12B is a communication flow illustrating an example discovery and UE pairing process based on a second mode in accordance with various aspects of the present disclosure.

FIG. 12B is a communication flow 1200B illustrating an example discovery and UE pairing process based on a second mode (e.g., Mode 2) in accordance with various aspects of the present disclosure. The numberings associated with the communication flow 1200B do not specify a particular temporal order and are merely used as references for the communication flow 1200B. Aspects presented herein may enable a first UE to send a message to notify other UEs (e.g., at least a second UE) of its presence during a UE-to-UE direct device discovery process, such as described in connection with FIG. 11A. For example, the first UE may broadcast a probing request (to discover) to neighboring UEs to respond for potential pairing and inference result exchange.

At 1228, a second UE 1204 (e.g., a discoverer) may broadcast an ND message 1214 to one or more neighboring UEs, which may include a first UE 1202. The ND message 1214 may include information associated with ML inference data service of the second UE 1204, such as ML inference data service ID, meta information of the features for each related ML inference models, meta information of the related ML inference models, inference output formats of the related inference ML models, inference performances of the related ML models, duration of the inference service that the second UE 1204 is plan to provide for the related ML models, or a combination thereof.

At 1230, based on the broadcasted ND message 1214, the first UE 1202 may send a pairing and inference result sharing request 1216 to the second UE 1204. Similarly, in some examples, the first UE 1202 may receive multiple ND responses from multiple neighboring UEs. In such scenarios, the first UE 1202 may be configured to select a UE or a set of UEs among the multiple neighboring UEs for the pairing based on predefined selection criteria and/or based on the ML inference data service information provided by each of the multiple neighboring UEs.

At 1232, after receiving the pairing and inference result sharing request 1216, the second UE 1204 may send a pairing acknowledgement 1218 back to the first UE 1202. Then, the first UE 1202 may be successfully paired to the second UE 1204.

Figure 13:
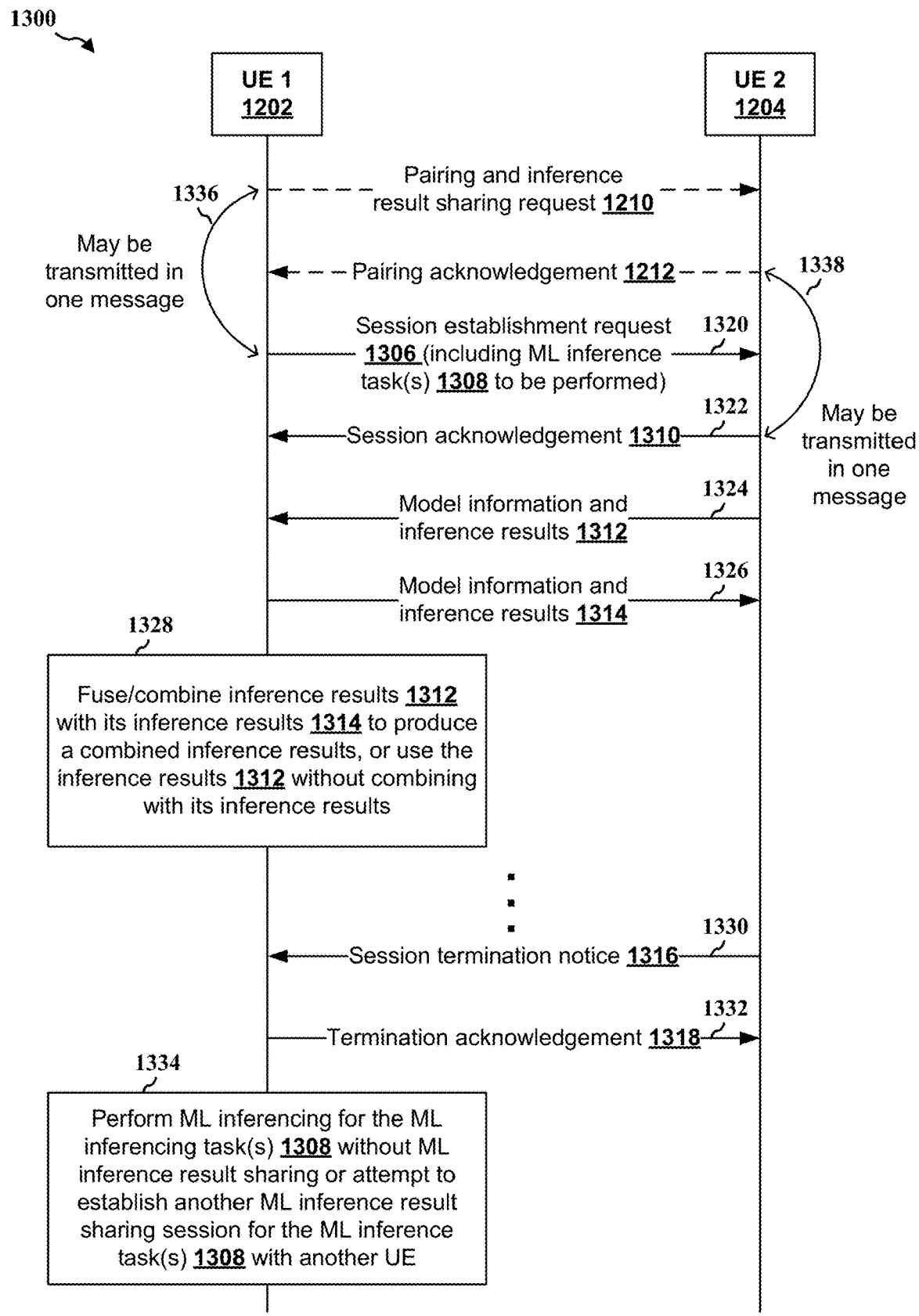
FIG. 13 is a communication flow illustrating an example ML inference result sharing session establishment in accordance with various aspects of the present disclosure.

FIG. 13 is a communication flow 1300 illustrating an example ML inference result sharing session establishment in accordance with various aspects of the present disclosure. The numberings associated with the communication flow 1300 do not specify a particular temporal order and are merely used as references for the communication flow 1300. Aspects presented herein may enable a first UE to receive and utilize inference results from another UE (e.g., a second UE) to improve its inference accuracy and performance.

At 1320, after the first UE 1202 is paired to the second UE 1204 or after the completion of the ML service discovery (e.g., after receiving the pairing acknowledgement 1212 as described in connection with FIGS. 12A and 12B), the first UE 1202 may send a session establishment request 1306 to the second UE 1204 for requesting an ML inference result sharing session to be established between the first UE 1202 and the second UE 1204. In one example, the session establishment request 1306 may specify or include one or more of the followings: at least one ML inference task 1308 or data specified or to be performed by the first UE 1202 (e.g., detecting the presence of pedestrians), inference data format specified by the first UE 1202 (e.g., a single numerical value that represents the probability, or a yes/no indication, etc.), an ML inference result sharing session duration specified by the first UE 1202 (e.g., a session of 5, 10 or 15 seconds, etc.), inference results/data update frequency specified by the first UE 1202 (e.g., sending updated inference results every 100 ms), whether the inference result sharing is based on uni-directional or bidirectional sharing (e.g., just the second UE 1204 sharing/transmitting its inference results with the first UE 1202, or both UEs sharing their inference results with each other), or a combination thereof. For purposes of the present disclosure, a session, an occasion or a duration in which at least one wireless device is transmitting/exchanging (either uni-directional or bi-directional) its ML inference result(s) with at least one another wireless device may be refer to as an "ML inference result sharing session." In addition, a task, a function or a goal in which an ML model is configured to perform or provide may be referred to as an ML inference task (e.g., detecting the presence of pedestrian at an intersection, detecting LOS blockage, etc.).

In some examples, the first UE 1202 may determine whether to send the session establishment request 1306 to the second UE 1204 (e.g., whether to establish the ML inference result sharing session with the second UE 1204) based on information associated with the second UE 1204 and/or associated with the ML model(s) at the second UE 1204. For example, based on the time stamp, location, sensor view, and/or performance indication (e.g., average accuracy, error rate, etc.) associated with the second UE 1204 and/or the ML model(s) at the second UE 1204 (which may be received from the second UE via the ND response 1208 or another message), the first UE 1202 may determine whether to send the session establishment request 1306 to the second UE 1204.

At 1322, after receiving the session establishment request 1306, the second UE 1204 may send a session acknowledgement 1310 back to first UE 1202 to start the ML inference result sharing session, such as described in connection with FIGS. 6 and 7.

In one example or configuration, as shown at 1336, the first UE 1202 may transmit the pairing and inference result sharing request 1210 (as discussed in connection with 1224 of FIG. 12A and 1230 of FIG. 12B) with the session establishment request 1306 at the same time in one message (e.g., the pairing and inference result sharing request 1210 and the session establishment request 1306 can be one message or the same message). Thus, as shown at 1338, the second UE 1204 may also transmit the pairing acknowledgement 1212 (as discussed in connection with 1226 of FIG. 12A and 1232 of FIG. 12B) with the session acknowledgement 1310 at the same time in one message (e.g., the pairing acknowledgement 1212 and the session acknowledgement 1310 can be one message or the same message).

At 1324, the second UE 1204 may transmit inference results 1312 for the at least one ML inference task 1308 to the first UE 1202 at a predetermined frequency/periodicity during the ML inference result sharing session. In some examples, as shown at 1326, if the ML inference result sharing session is based on a bidirectional sharing, the first UE 1202 may also transmit its inference results 1314 for the at least one ML inference task 1308 to the second UE 1204 at a predetermined frequency/periodicity during the ML inference result sharing session.

At 1328, after the first UE 1202 receives the inference results 1312 from the second UE 1204, the first UE 1202 may fuse, combine, or aggregate inference results 1312 with its inference results to produce a combined inference results, such as described in connection with FIG. 5. For example, if the first UE 1202 determines that the UE capabilities of the second UE 1204 is better than the first UE 1202, the ML model used by the second UE 1204 is better than the first UE 1202, and/or that the second UE 1204 is at a more suitable location for performing the ML inference result sharing (e.g., right at the location where the ML inference task is to be performed), the first UE 1202 may determine to apply a higher weight/coefficient to the inference results from the second UE 1204 (e.g., coefficient=0.1 for inference results from the first UE 1202 and coefficient=0.9 for inference results from the second UE 1204, etc.).

In some examples, the first UE 1202 may also determine to solely rely on the inference results 1312 from the second UE 1204 (e.g., without combining with its own inference results or giving its inference result a zero weight, etc.). This may occur when the related ML model(s) and/or UE capabilities at the second UE 1204 have much better accuracy and performance compared to the first UE 1202. For example, the first UE 1202 may determine to use the inference results from the second UE 1204 by assigning coefficient=0 for inference results from the first UE 1202 and coefficient=1 for inference results from the second UE 1204, etc.

In another example, the aggregation or fusion of the inference results may be a second stage of inference using ML/NN. For example, in addition to weights or coefficients for combining using weighted average as an example, the combining may also be joining the predictions together (with some filtering) for a more accurate prediction in time and space (e.g., prediction1 at time t1 and t3, and prediction2 at time t2 and t4 may be joined or integrated into prediction12 at time {a, t2, t3, t4}; prediction1 at location/view v1 and v3, and prediction2 at location/view v2 and v4 may be joined or integrated into prediction12 at location view {v1, v2, v3, v4}). To support this, tag(s) or label(s) may be added to the predictions such as time or location/view to the exchanged ML inference results (e.g., predictions), such as at 1324 and/or 1326.

In some examples, the first UE 1202 may determine whether to aggregate its inference results with the inference results from the second UE 1204 based on information associated with the second UE 1204 and/or the ML inference results from the second UE 1204. For example, based on the time stamp, location, sensor view, and/or performance indication (e.g., average accuracy, error rate, etc.) associated with the second UE 1204 and/or the ML inference results from the second UE 1204, the first UE 1202 may determine whether to aggregate its inference results with the inference results from the second UE 1204. If the first UE 1202 determines that aggregating the inference results from the second UE 1204 is not going to improve its inference accuracy (e.g., the ML inference from the second UE 1204 has become outdated, the ML inference is based on a camera view that is unable to capture the intersection to be detected, etc.), the first UE 1202 may determine to skip aggregating the inference results from the second UE 1204 with its own inference results.

The exchanging of the inference results between the first UE 1202 and the second UE 1204 (and the utilization of the second UE 1204's inference results 1312 at 1328) may continue and repeat until the ML inference result sharing session expires (e.g., based on the predefined session duration).

In some examples, as shown at 1330, a second UE 1204 may be able to terminate the ML inference result sharing session (e.g., prior to the expiration of the predefined session duration) by sending a session termination notice 1316 to the first UE 1202. In other examples, termination of the ML inference result sharing session may also be triggered by the performance of the prediction, the termination of the prediction model, and/or the providing UE's status (e.g., power level, communication loading, location, etc.).

At 1332, in response to the session termination notice 1316, the first UE 1202 may send a termination acknowledgement 1318 accordingly to the second UE 1204.

At 1334, after the ML inference result sharing session between the first UE 1202 and the second UE 1204 is terminated, the first UE 1202 may be de-paired from the second UE 1204. Then, the first UE 1202 may perform ML inferencing for the at least one ML inference task 1308 at its own (e.g., without the ML inference result sharing with another UE), or the first UE 1202 may attempt to establish another ML inference result sharing session for the at least one ML inference task 1308 (or for another ML inference task) with another UE. In other words, the first UE 1202 may choose to use its own ML model inference or start a discovery and pairing process with another UE.

In some scenarios, a network entity (e.g., a base station, a component of a base station, the RIC in an O-RAN architecture, an AI/ML entity, and/or a function at a RAN or core network) may be configured to assist the distribution, configuration, and/or re-configuration of the weights/coefficients for the UEs to fuse, combine, or aggregate their inference results. For example, the coefficients for the inference results may be scalars with a value between 0 and 1 that is associated with each of the inference results (which are different from trained weights associated with different ML models that are typically represented by a matrix or a set of matrices).

Figure 14:
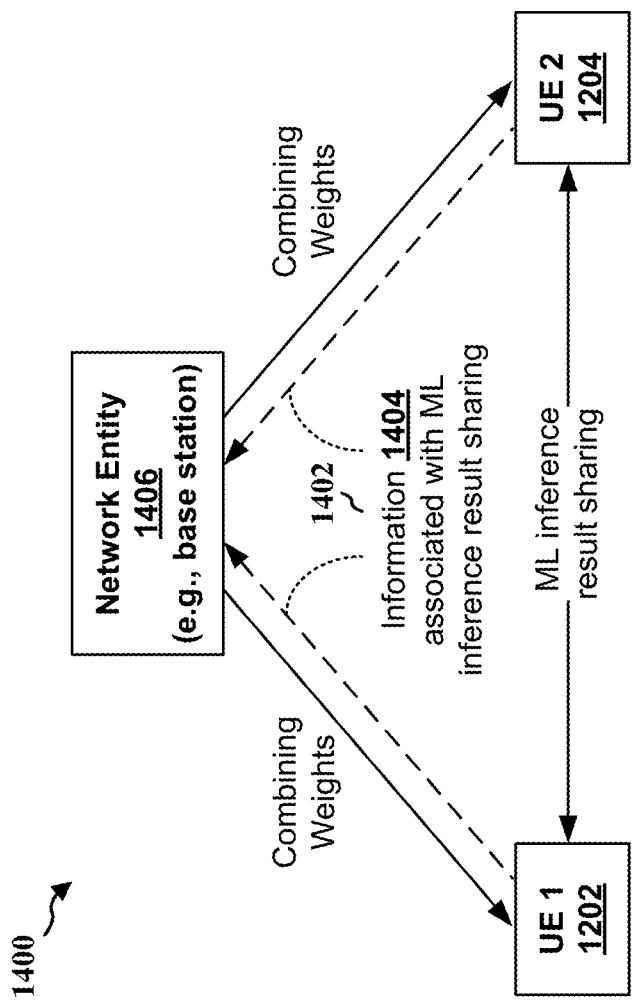
FIG. 14 is a diagram illustrating an example of a network entity configuring UEs with weights or weight coefficients for combining their inference results in accordance with various aspects of the present disclosure.

FIG. 14 is a diagram 1400 illustrating an example of a network entity configuring UEs with weights for combining their inference results in accordance with various aspects of the present disclosure. As described in connection with FIGS. 12A, 12B, and 13, a first UE 1202 and a second UE 1204 may establish an ML inference result sharing session with each other and exchange their ML inference results for the same ML inference task.

In one example, as shown at 1402, the first UE 1202 and/or the second UE 1204 may send information 1404 associated with their ML inference result sharing session to a network entity 1406 (e.g., a base station or component of the base station). For example, the information may include meta information related to their pairing, their UE capabilities, information related to their processing hardware, respective meta information about their ML models and/or ML inference tasks to be performed, or a combination thereof.

Based on the information 1404 received from the first UE 1202 and/or the second UE 1204, the network entity 1406 may determine the appropriate/suitable weights/coefficients for the first UE 1202 and/or the second UE 1204 to combine their inference results. For example, if the network entity 1406 determines that the UE capabilities of the second UE 1204 is better than the first UE 1202, the ML model used by the second UE 1204 is better than the first UE 1202, and/or that the second UE 1204 is at a more suitable location for performing the ML inference result sharing (e.g., right at the location where the ML inference task is to be performed), the network entity 1406 may assign a higher weight to the inference results from the second UE 1204 (e.g., coefficient=0.2 for inference results from the first UE 1202 and coefficient=0.8 for inference results from the second UE 1204, etc.). As such, the network entity 1406 may coordinate the cooperative inference result sharing between the first UE 1202 and the second UE 1204 by sending them the weights.

In one example, if the pairing between the first UE 1202 and the second UE 1204 is actively maintained, the first UE 1202 and/or the second UE 1204 may use the weights/coefficients provided by the network entity 1406 to fuse, combine or aggregate their inference results. However, when de-pairing between the first UE 1202 and the second UE 1204 occurs (e.g., the first UE 1202 and the second UE 1204 are unable to maintain the connection due to termination, disconnection, or expiration of session, etc.), the first UE 1202 and/or the second UE 1204 may continue/resume to perform ML inference using their respective ML models. In another example, if the first UE 1202 and the second UE 1204 repair within a defined period (e.g., after a short period of de-paring/departing), the network entity 1406 may be configured to inform the first UE 1202 and/or the second UE 1204 (e.g., based on whomever is going to perform inference results fusion/aggregation) to use previous weights to combine their inference results.

As such, to provide combining weights/coefficients for aggregating inference results between the first UE 1202 and the second UE 1204 (or between paired passenger UEs, paired passenger UE and vehicle UE, or paired vehicle UEs, etc.) for the tasks such as (collaboratively) detecting the presence of pedestrians at an intersection (e.g., FIG. 6) and/or the beam blocking condition (e.g., FIG. 7), the network entity 1406 may be configured to store, look up, select, and/or distribute the combining weights and coefficients. In addition, the combining weights/coefficients may be selected based on many factors, such as the type of pairing device, the type of inference models, positions, and/or mobility of the pairing devices, etc.

Figure 15:
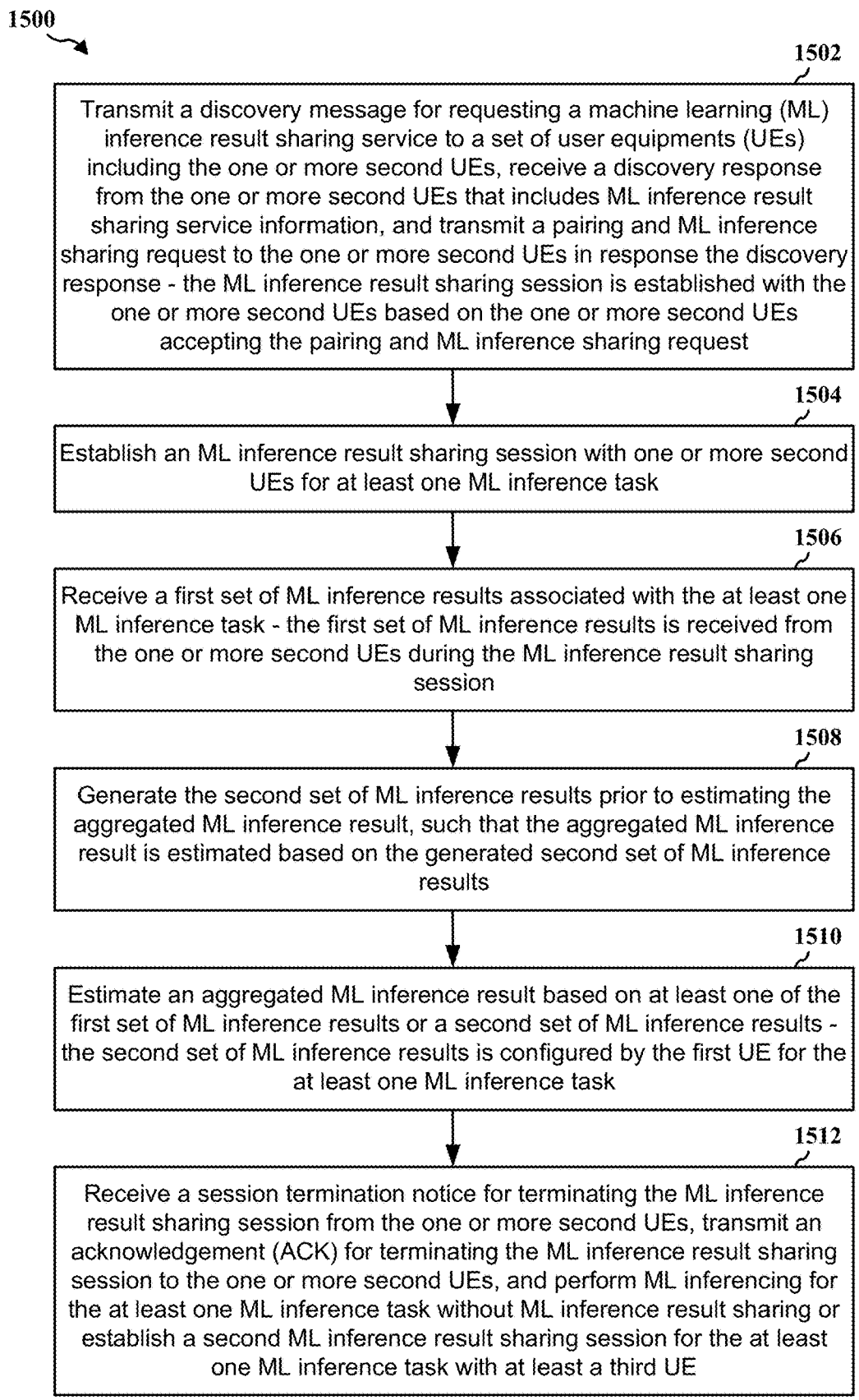
FIG. 15 is a flowchart of a method of wireless communication.

FIG. 15 is a flowchart 1500 of a method of wireless communication. The method may be performed by a first UE (e.g., the UE 104, 902, 904, 906, 908; the first VUE 604; the passenger UE 706; the first UE 1004, 1102, 1112, 1202; the second UE 1006; the apparatus 1704). The method may enable the first UE to utilize inference results provided by at least a second UE to improve its ML inference accuracy.

At 1504, the first UE may establish an ML inference result sharing session with one or more second UEs for at least one ML inference task, such as described in connection with FIGS. 12A, 12B, and 13. For example, at 1320 and 1322 of FIG. 13, the first UE 1202 may establish an ML inference result sharing session with the second UE 1204 by sending a session establishment request 1306 that includes at least one ML inference task 1308 to be performed. The establishment of the ML inference result sharing session may be performed by, e.g., the inference result process component 198, the cellular baseband processor 1724, and/or the transceiver(s) 1722 of the apparatus 1704 in FIG. 17.

In one example, to establish the ML inference result sharing session for the at least one ML inference task with the one or more second UEs, the first UE may transmit a request to establish the ML inference result sharing session to the one or more second UEs, and the first UE may receive an ACK for establishing the ML inference result sharing session from the one or more second UEs. In such an example, the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

At 1506, the first UE may receive a first set of ML inference results associated with the at least one ML inference task, where the first set of ML inference results is received from the one or more second UEs during the ML inference result sharing session, such as described in connection with FIGS. 12A, 12B, and 13. For example, at 1324 of FIG. 13, the first UE 1202 may receive model information and inference results 1314 from the second UE 1204 for the at least one ML inference task 1308. The reception of the first set of ML inference results associated with the at least one ML inference task may be performed by, e.g., the inference result process component 198, the cellular baseband processor 1724, and/or the transceiver(s) 1722 of the apparatus 1704 in FIG. 17.

At 1510, the first UE may estimate an aggregated ML inference result based on at least one of the first set of ML inference results or a second set of ML inference results, where the second set of ML inference results is configured by the first UE for the at least one ML inference task, such as described in connection with FIGS. 12A, 12B, and 13. For example, at 1328 of FIG. 13, the first UE 1202 may fuse/combine inference results 1312 with its inference results 1314 to produce a combined inference results, or use the inference results 1312 without combining with its inference results. The estimation of the aggregated ML inference result may be performed by, e.g., the inference result process component 198, the cellular baseband processor 1724, and/or the transceiver(s) 1722 of the apparatus 1704 in FIG. 17.

In one example, prior to establishing the ML inference result sharing session with the one or more second UEs for the at least one ML inference task, at 1502, the first UE may transmit a discovery message for requesting an ML inference result sharing service to a set of UEs including the one or more second UEs, the first UE may receive a discovery response from the one or more second UEs that includes ML inference result sharing service information, and the first UE may transmit a pairing and ML inference sharing request to the one or more second UEs in response the discovery response, where the ML inference result sharing session is established with the one or more second UEs based on the one or more second UEs accepting the pairing and ML inference sharing request, such as described in connection with FIGS. 12A and 12B. The transmission of the discovery message, reception of the discovery response, and/or the transmission of the pairing and ML inference sharing request may be performed by, e.g., the inference result process component 198, the cellular baseband processor 1724, and/or the transceiver(s) 1722 of the apparatus 1704 in FIG. 17.

In such an example, the ML inference result sharing service information includes at least one of: an ML inference data service ID, first information of a set of features associated with one or more ML inference models at the one or more second UEs, second information associated with the one or more ML inference models, third information associated with ML inference result fusion, ML inference output formats associated with the one or more ML inference models, ML inference performances associated with the one or more ML inference models, or duration of ML inference service in which the one or more second UEs are able to provide for the one or more ML inference models. In such an example, the discovery message is a ND message, where the ND message is associated with a capability of the one or more second UEs for participating a discovery process.

In another example, at 1508, the first UE may generate the second set of ML inference results prior to estimating the aggregated ML inference result, such that the aggregated ML inference result is estimated based on the generated second set of ML inference results, such as described in connection with FIGS. 12A, 12B, and 13. For example, at 1326 of FIG. 13, the first UE 1202 may generate the ML inference results 1314 prior to estimating the aggregated ML inference result. The generation of the second set of ML inference results may be performed by, e.g., the inference result process component 198, the cellular baseband processor 1724, and/or the transceiver(s) 1722 of the apparatus 1704 in FIG. 17. In such an example, the first UE may transmit an indication of the generated second set of ML inference results to the one or more second UEs.

In another example, at 1512, the first UE may receive a session termination notice for terminating the ML inference result sharing session from the one or more second UEs, the first UE may transmit an acknowledgement for terminating the ML inference result sharing session to the one or more second UEs, and the first UE may perform ML inferencing for the at least one ML inference task without ML inference result sharing or establishing a second ML inference result sharing session for the at least one ML inference task with at least a third UE, such as described in connection with FIGS. 12A, 12B, and 13. The reception of the session termination notice, the transmission of the acknowledgement for terminating the ML inference result sharing session, and/or the performing of the ML inferencing for the at least one ML inference task without ML inference result sharing or the establishing of the second ML inference result sharing session for the at least one ML inference task with at least a third UE may be performed by, e.g., the inference result process component 198, the cellular baseband processor 1724, and/or the transceiver(s) 1722 of the apparatus 1704 in FIG. 17.

In another example, to estimate the aggregated ML inference result, the first UE may combine the first set of ML inference results with the second set of ML inference results. In such an example, the first UE may receive a weight distribution from a network entity for the first set of ML inference results and the second set of ML inference results, where the first set of ML inference results and the second set of ML inference results are combined based on the weight distribution. In such an example, the first UE may transmit information associated with the ML inference result sharing session to the network entity, where the weight distribution is received in response to the transmitted information.

In another example, the first set of ML inference results is based on a first ML model and the second set of ML inference results is based on a second ML model that is different from the first ML model.

In another example, the first UE has a first capability for ML processing and the one or more second UEs have a second capability for ML processing, where the first capability for ML processing is lower than the second capability for ML processing.

Figure 16:
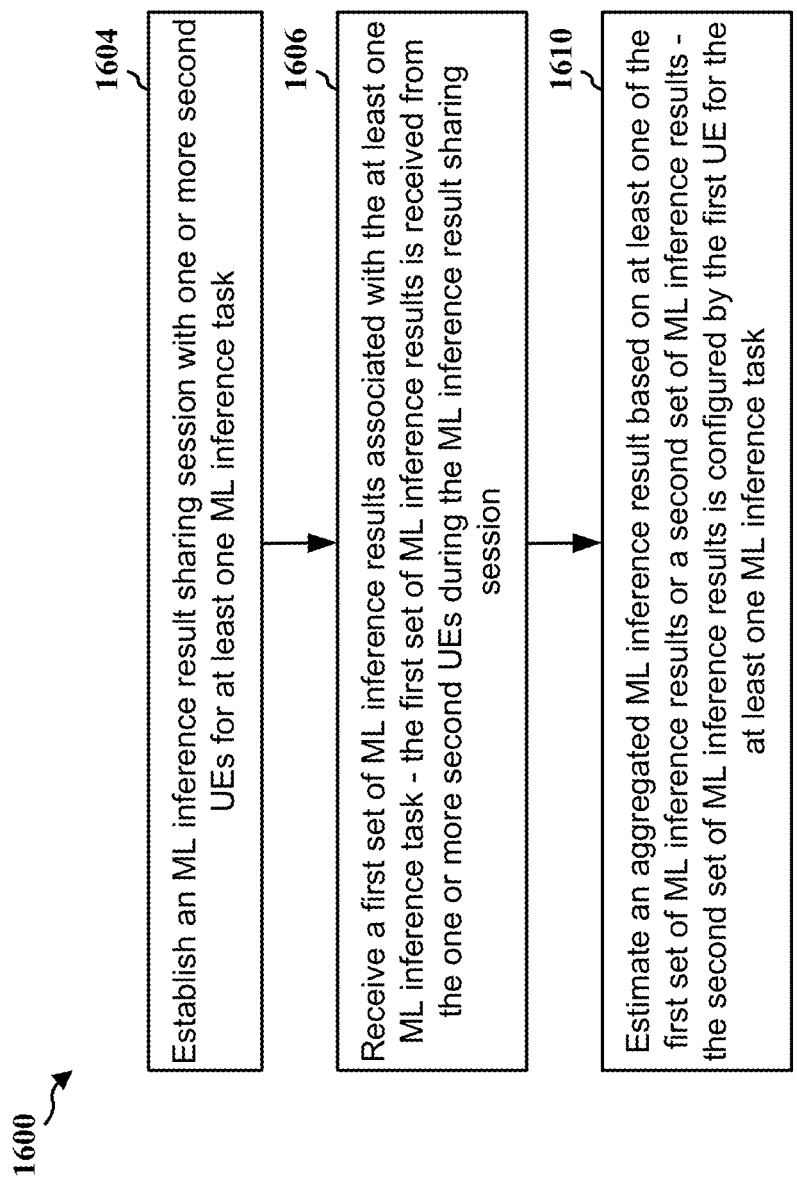
FIG. 16 is a flowchart of a method of wireless communication.

FIG. 16 is a flowchart 1600 of a method of wireless communication. The method may be performed by a first UE (e.g., the UE 104, 902, 904, 906, 908; the first VUE 604; the passenger UE 706; the first UE 1004, 1102, 1112, 1202; the second UE 1006; the apparatus 1704). The method may enable the first UE to utilize inference results provided by at least a second UE to improve its ML inference accuracy.

At 1604, the first UE may establish an ML inference result sharing session with one or more second UEs for at least one ML inference task, such as described in connection with FIGS. 12A, 12B, and 13. For example, at 1320 and 1322 of FIG. 13, the first UE 1202 may establish an ML inference result sharing session with the second UE 1204 by sending a session establishment request 1306 that includes at least one ML inference task 1308 to be performed. The establishment of the ML inference result sharing session may be performed by, e.g., the inference result process component 198, the cellular baseband processor 1724, and/or the transceiver(s) 1722 of the apparatus 1704 in FIG. 17.

In one example, to establish the ML inference result sharing session for the at least one ML inference task with the one or more second UEs, the first UE may transmit a request to establish the ML inference result sharing session to the one or more second UEs, and the first UE may receive an ACK for establishing the ML inference result sharing session from the one or more second UEs. In such an example, the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

At 1606, the first UE may receive a first set of ML inference results associated with the at least one ML inference task, where the first set of ML inference results is received from the one or more second UEs during the ML inference result sharing session, such as described in connection with FIGS. 12A, 12B, and 13. For example, at 1324 of FIG. 13, the first UE 1202 may receive model information and inference results 1314 from the second UE 1204 for the at least one ML inference task 1308. The reception of the first set of ML inference results associated with the at least one ML inference task may be performed by, e.g., the inference result process component 198, the cellular baseband processor 1724, and/or the transceiver(s) 1722 of the apparatus 1704 in FIG. 17.

At 1610, the first UE may estimate an aggregated ML inference result based on at least one of the first set of ML inference results or a second set of ML inference results, where the second set of ML inference results is configured by the first UE for the at least one ML inference task, such as described in connection with FIGS. 12A, 12B, and 13. For example, at 1328 of FIG. 13, the first UE 1202 may fuse/combine inference results 1312 with its inference results 1314 to produce a combined inference results, or use the inference results 1312 without combining with its inference results. The estimation of the aggregated ML inference result may be performed by, e.g., the inference result process component 198, the cellular baseband processor 1724, and/or the transceiver(s) 1722 of the apparatus 1704 in FIG. 17.

In one example, prior to establishing the ML inference result sharing session with the one or more second UEs for the at least one ML inference task, the first UE may transmit a discovery message for requesting an ML inference result sharing service to a set of UEs including the one or more second UEs, the first UE may receive a discovery response from the one or more second UEs that includes ML inference result sharing service information, and the first UE may transmit a pairing and ML inference sharing request to the one or more second UEs in response the discovery response, where the ML inference result sharing session is established with the one or more second UEs based on the one or more second UEs accepting the pairing and ML inference sharing request, such as described in connection with FIGS. 12A and 12B. The transmission of the discovery message, reception of the discovery response, and/or the transmission of the pairing and ML inference sharing request may be performed by, e.g., the inference result process component 198, the cellular baseband processor 1724, and/or the transceiver(s) 1722 of the apparatus 1704 in FIG. 17. In such an example, the ML inference result sharing service information includes at least one of: an ML inference data service ID, first information of a set of features associated with one or more ML inference models at the one or more second UEs, second information associated with the one or more ML inference models, third information associated with ML inference result fusion, ML inference output formats associated with the one or more ML inference models, ML inference performances associated with the one or more ML inference models, or duration of ML inference service in which the one or more second UEs are able to provide for the one or more ML inference models. In such an example, the discovery message is a ND message, where the ND message is associated with a capability of the one or more second UEs for participating a discovery process.

In another example, the first UE may generate the second set of ML inference results prior to estimating the aggregated ML inference result, such that the aggregated ML inference result is estimated based on the generated second set of ML inference results, such as described in connection with FIGS. 12A, 12B, and 13. For example, at 1326 of FIG. 13, the first UE 1202 may generate the ML inference results 1314 prior to estimating the aggregated ML inference result. The generation of the second set of ML inference results may be performed by, e.g., the inference result process component 198, the cellular baseband processor 1724, and/or the transceiver(s) 1722 of the apparatus 1704 in FIG. 17. In such an example, the first UE may transmit an indication of the generated second set of ML inference results to the one or more second UEs.

In another example, the first UE may receive a session termination notice for terminating the ML inference result sharing session from the one or more second UEs, the first UE may transmit an acknowledgement for terminating the ML inference result sharing session to the one or more second UEs, and the first UE may perform ML inferencing for the at least one ML inference task without ML inference result sharing or establishing a second ML inference result sharing session for the at least one ML inference task with at least a third UE, such as described in connection with FIGS. 12A, 12B, and 13. The reception of the session termination notice, the transmission of the acknowledgement for terminating the ML inference result sharing session, and/or the performing of the ML inferencing for the at least one ML inference task without ML inference result sharing or the establishing of the second ML inference result sharing session for the at least one ML inference task with at least a third UE may be performed by, e.g., the inference result process component 198, the cellular baseband processor 1724, and/or the transceiver(s) 1722 of the apparatus 1704 in FIG. 17.

In another example, to estimate the aggregated ML inference result, the first UE may combine the first set of ML inference results with the second set of ML inference results. In such an example, the first UE may receive a weight distribution from a network entity for the first set of ML inference results and the second set of ML inference results, where the first set of ML inference results and the second set of ML inference results are combined based on the weight distribution. In such an example, the first UE may transmit information associated with the ML inference result sharing session to the network entity, where the weight distribution is received in response to the transmitted information.

In another example, the first set of ML inference results is based on a first ML model and the second set of ML inference results is based on a second ML model that is different from the first ML model.

In another example, the first UE has a first capability for ML processing and the one or more second UEs have a second capability for ML processing, where the first capability for ML processing is lower than the second capability for ML processing.

Figure 17:
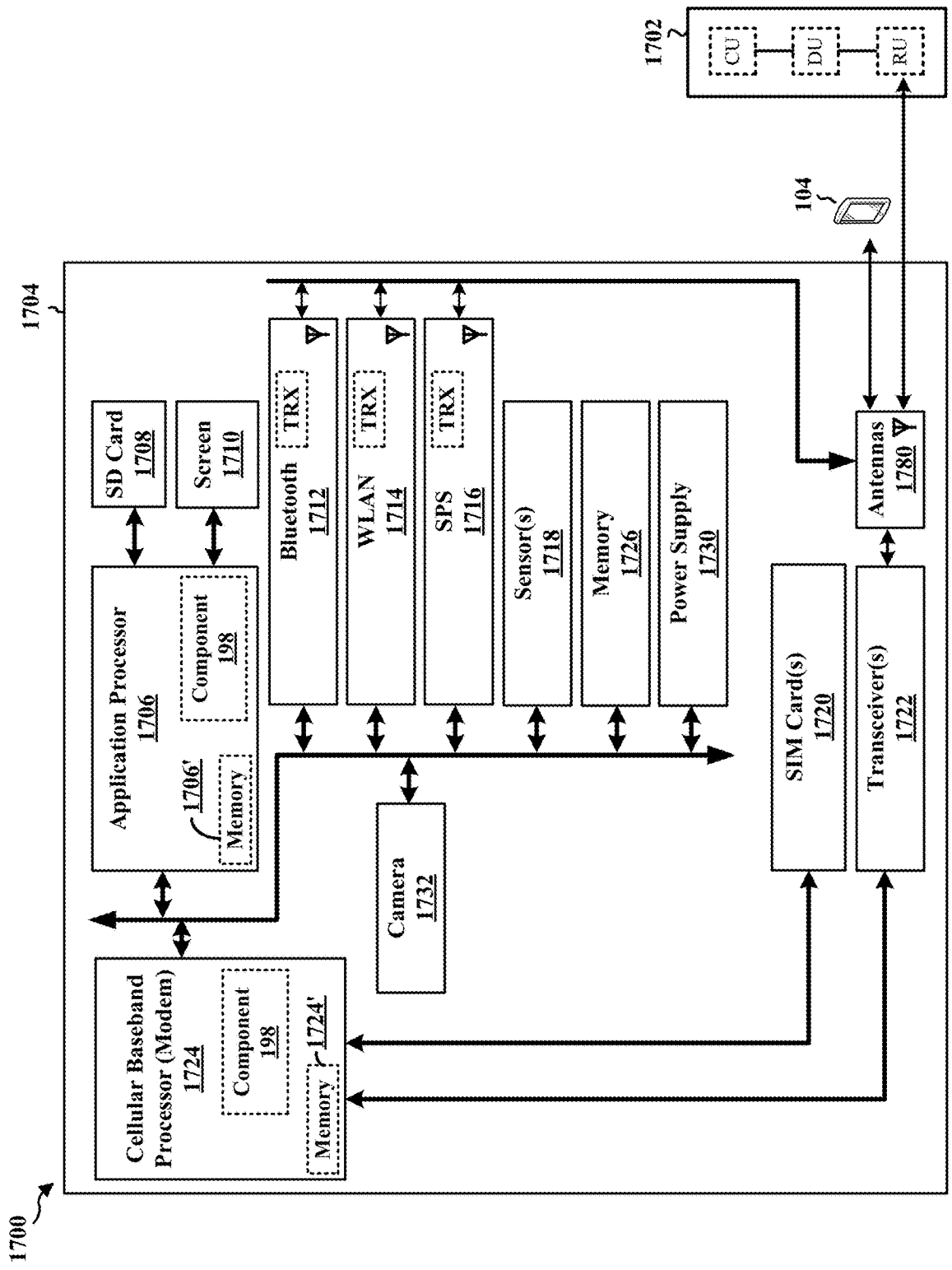
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the inference result process component 198 is configured to establish an ML inference result sharing session with one or more second UEs for at least one ML inference task. The inference result process component 198 may also be configured to receive a first set of ML inference results associated with the at least one ML inference task, where the first set of ML inference results is received from the one or more second UEs during the ML inference result sharing session. The inference result process component 198 may also be configured to estimate an aggregated ML inference result based on at least one of the first set of ML inference results or a second set of ML inference results, where the second set of ML inference results is configured by the first UE for the at least one ML inference task. The inference result process component 198 may be within the cellular baseband processor 1724, the application processor 1706, or both the cellular baseband processor 1724 and the application processor 1706. The inference result process component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for establishing an ML inference result sharing session with one or more second UEs for at least one ML inference task. The apparatus 1704 may further include means for receiving a first set of ML inference results associated with the at least one ML inference task, where the first set of ML inference results is received from the one or more second UEs during the ML inference result sharing session. The apparatus 1704 may further include means for estimating an aggregated ML inference result based on at least one of the first set of ML inference results or a second set of ML inference results, where the second set of ML inference results is configured by the first UE for the at least one ML inference task.

In one configuration, the means for establishing the ML inference result sharing session for the at least one ML inference task with the one or more second UEs further include configuring the apparatus 1704 to transmit a request to establish the ML inference result sharing session to the one or more second UEs, and receive an ACK for establishing the ML inference result sharing session from the one or more second UEs. In such a configuration, the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

In another configuration, prior to establishing the ML inference result sharing session with the one or more second UEs for the at least one ML inference task, the apparatus 1704 may further include means for transmitting a discovery message for requesting an ML inference result sharing service to a set of UEs including the one or more second UEs, means for receiving a discovery response from the one or more second UEs that includes ML inference result sharing service information, and means for transmitting a pairing and ML inference sharing request to the one or more second UEs in response the discovery response, where the ML inference result sharing session is established with the one or more second UEs based on the one or more second UEs accepting the pairing and ML inference sharing request. In such a configuration, the ML inference result sharing service information includes at least one of: an ML inference data service ID, first information of a set of features associated with one or more ML inference models at the one or more second UEs, second information associated with the one or more ML inference models, third information associated with ML inference result fusion, ML inference output formats associated with the one or more ML inference models, ML inference performances associated with the one or more ML inference models, or duration of ML inference service in which the one or more second UEs are able to provide for the one or more ML inference models. In such a configuration, the discovery message is a ND message, where the ND message is associated with a capability of the one or more second UEs for participating a discovery process.

In another configuration, the apparatus 1704 may further include means for generating the second set of ML inference results prior to estimating the aggregated ML inference result, such that the aggregated ML inference result is estimated based on the generated second set of ML inference results. In such a configuration, the apparatus 1704 may further include means for transmitting an indication of the generated second set of ML inference results to the one or more second UEs.

In another configuration, the apparatus 1704 may further include means for receiving a session termination notice for terminating the ML inference result sharing session from the one or more second UEs, means for transmitting an acknowledgement for terminating the ML inference result sharing session to the one or more second UEs, and means for performing ML inferencing for the at least one ML inference task without ML inference result sharing or establishing a second ML inference result sharing session for the at least one ML inference task with at least a third UE.

In another configuration, the means for estimating the aggregated ML inference result may include configuring the apparatus 1704 to combine the first set of ML inference results with the second set of ML inference results. In such a configuration, the apparatus 1704 may further include means for receiving a weight distribution from a network entity for the first set of ML inference results and the second set of ML inference results, where the first set of ML inference results and the second set of ML inference results are combined based on the weight distribution. In such a configuration, the apparatus 1704 may further include means for transmitting information associated with the ML inference result sharing session to the network entity, where the weight distribution is received in response to the transmitted information.

In another configuration, the first set of ML inference results is based on a first ML model and the second set of ML inference results is based on a second ML model that is different from the first ML model.

In another configuration, the first UE has a first capability for ML processing and the one or more second UEs have a second capability for ML processing, where the first capability for ML processing is lower than the second capability for ML processing.

The means may be the inference result process component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
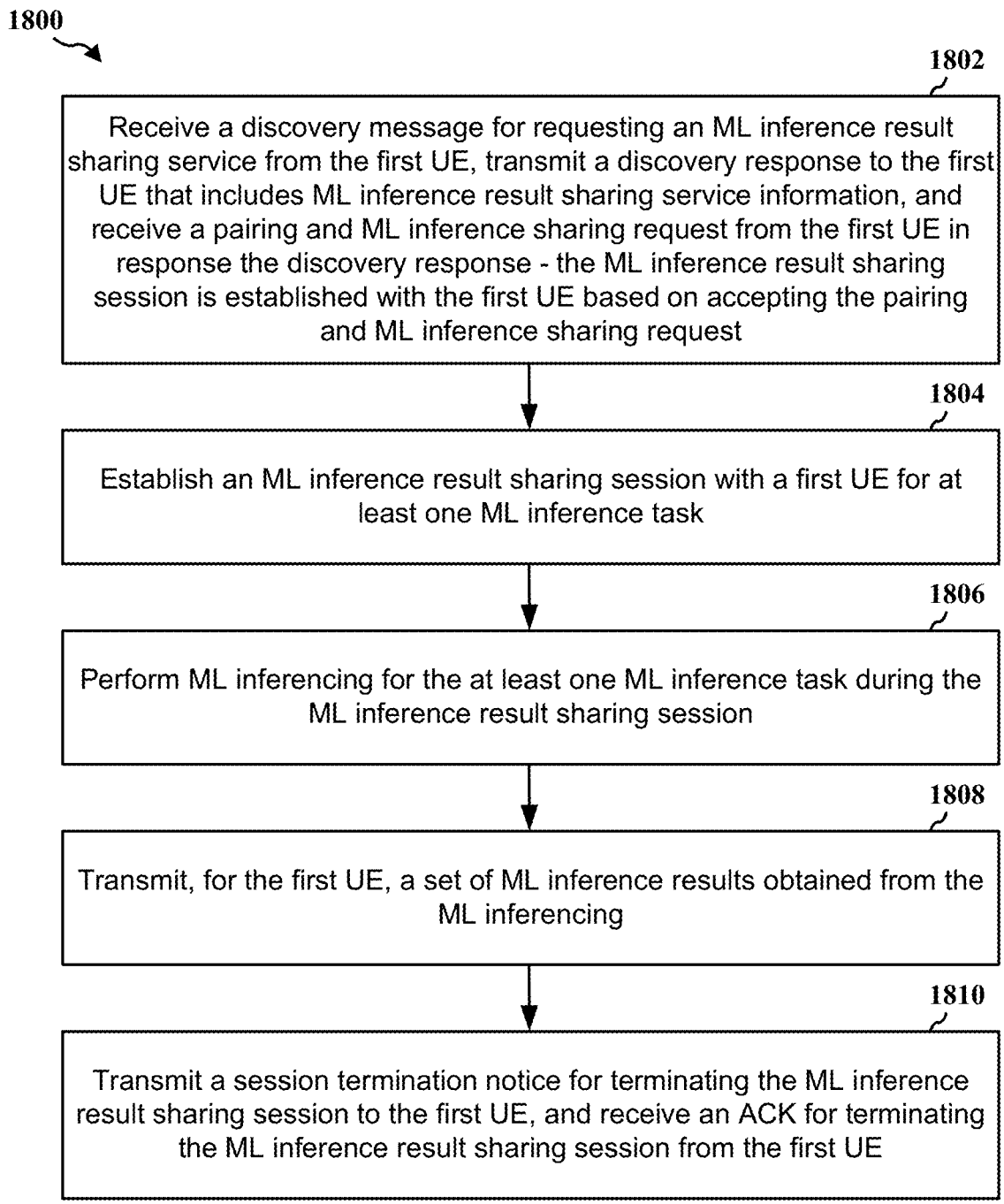
FIG. 18 is a flowchart of a method of wireless communication.

FIG. 18 is a flowchart 1800 of a method of wireless communication. The method may be performed by a second UE (e.g., UE 104, UE 902, UE 904, UE 906, UE 908, UE(s) 1104, UE(s) 1114; second VUE 608, VUE 704; the first UE 1004; the second UE 1006, 1204; the apparatus 2004). The method may enable the second UE to share its inference results to a first UE to improve the inference accuracy of the first UE and/or of its own.

At 1804, the second UE may establish an ML inference result sharing session with a first UE for at least one ML inference task, such as described in connection with FIGS. 12A, 12B, and 13. For example, at 1320 and 1322 of FIG. 13, the second UE 1204 may establish an ML inference result sharing session with the first UE 1202 by receiving/accepting a session establishment request 1306 that includes at least one ML inference task 1308 to be performed. The establishment of the ML inference result sharing session may be performed by, e.g., the inference result sharing component 197, the cellular baseband processor 2024, and/or the transceiver(s) 2022 of the apparatus 2004 in FIG. 20.

At 1806, the second UE may perform ML inferencing for the at least one ML inference task during the ML inference result sharing session, such as described in connection with FIGS. 12A, 12B, and 13. For example, at 1324 of FIG. 13, the second UE 1204 may perform ML inferencing for the at least one ML inference task 1308 and generate inference results 1312. The ML inferencing may be performed by, e.g., the inference result sharing component 197, the cellular baseband processor 2024, and/or the transceiver(s) 2022 of the apparatus 2004 in FIG. 20.

At 1808, the second UE may transmit, for the first UE, a set of ML inference results obtained from the ML inferencing, such as described in connection with FIGS. 12A, 12B, and 13. For example, at 1324 of FIG. 13, the second UE 1204 may transmit inference results 1312 associated with the at least one ML inference task 1308 to the first UE 1202. The transmission of the ML inference results may be performed by, e.g., the inference result sharing component 197, the cellular baseband processor 2024, and/or the transceiver(s) 2022 of the apparatus 2004 in FIG. 20.

In one example, prior to establishing the ML inference result sharing session with the first UE for at least one ML inference task, at 1802, the second UE may receive a discovery message for requesting an ML inference result sharing service from the first UE, transmit a discovery response to the first UE that includes ML inference result sharing service information, and receive a pairing and ML inference sharing request from the first UE in response the discovery response, where the ML inference result sharing session is established with the first UE based on accepting the pairing and ML inference sharing request, such as described in connection with FIGS. 12A, 12B, and 13. The reception of the discovery message, the transmission of the discovery response, and/or the reception of the pairing and ML inference sharing request may be performed by, e.g., the inference result sharing component 197, the cellular baseband processor 2024, and/or the transceiver(s) 2022 of the apparatus 2004 in FIG. 20. In such an example, the ML inference result sharing service information include at least one of: an ML inference data service ID, first information of a set of features associated with one or more ML inference models at the second UE, second information associated with the one or more ML inference models, third information associated with ML inference result fusion, ML inference output formats associated with the one or more ML inference models, ML inference performances associated with the one or more ML inference models, or duration of ML inference service in which the second UE is able to provide for the one or more ML inference models. In such an example, the discovery message is a ND message, where the ND message is associated with a capability of the second UE for participating a discovery process.

In another example, at 1810, the second UE may transmit a session termination notice for terminating the ML inference result sharing session to the first UE, and receive an ACK for terminating the ML inference result sharing session from the first UE, such as described in connection with FIGS. 12A, 12B, and 13. For example, at 1330 and 1332 of FIG. 13, the second UE 1204 may transmit a session termination notice 1316 to the first UE 1202, and receive a termination acknowledgement 1318 from the first UE 1202 in response to the session termination notice 1316. The transmission of the session termination notice and/or the reception of the ACK for terminating the ML inference result sharing session may be performed by, e.g., the inference result sharing component 197, the cellular baseband processor 2024, and/or the transceiver(s) 2022 of the apparatus 2004 in FIG. 20.

In another example, to establishing the ML inference result sharing session with the first UE for the at least one ML inference task, the second UE may receive a request to establish the ML inference result sharing session from the first UE, and transmit an ACK for establishing the ML inference result sharing session to the first UE. In such an example, the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

In another example, the second UE may receive a second set of ML inference results for the at least one ML inference task from the first UE.

In another example, the first UE has a first capability for ML processing and the one second UE has a second capability for ML processing, where the first capability for ML processing is lower than the second capability for ML processing.

Figure 19:
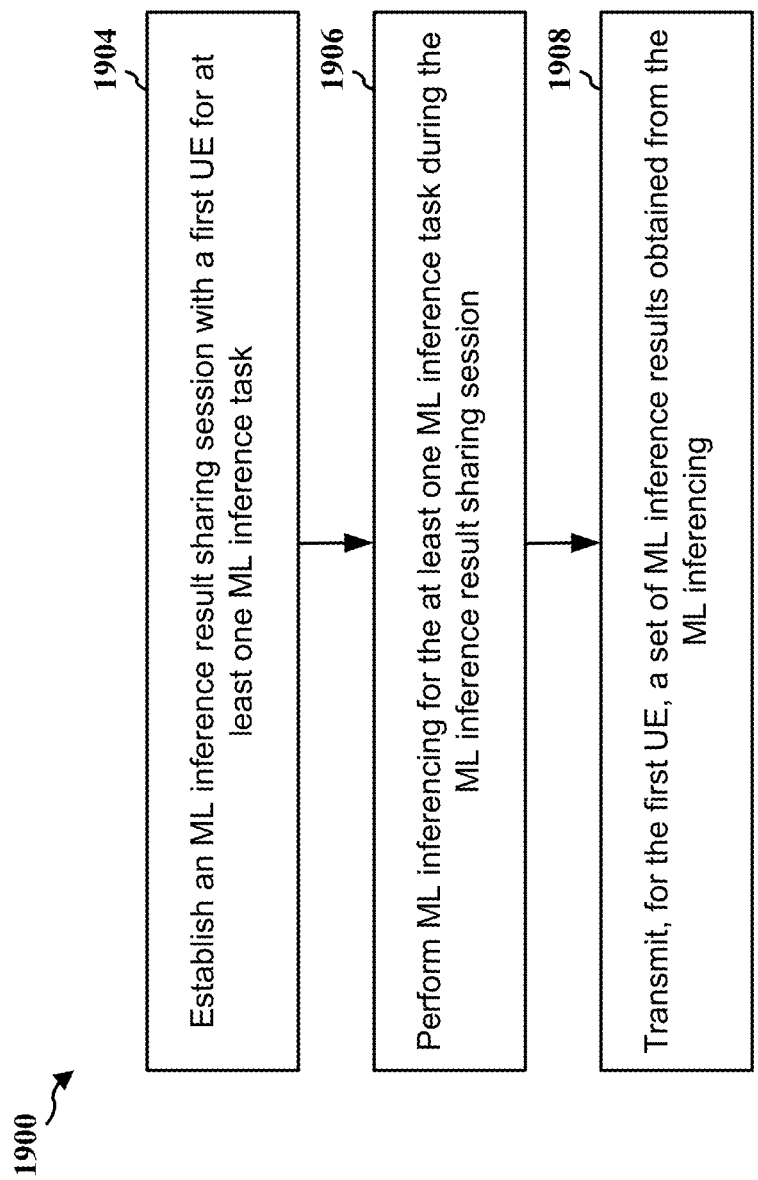
FIG. 19 is a flowchart of a method of wireless communication.

FIG. 19 is a flowchart 1900 of a method of wireless communication. The method may be performed by a second UE (e.g., UE 104, UE 902, UE 904, UE 906, UE 908, UE(s) 1104, UE(s) 1114; second VUE 608, VUE 704; the first UE 1004; the second UE 1006, 1204; the apparatus 2004). The method may enable the second UE to share its inference results to a first UE to improve the inference accuracy of the first UE and/or of its own.

At 1904, the second UE may establish an ML inference result sharing session with a first UE for at least one ML inference task, such as described in connection with FIGS. 12A, 12B, and 13. For example, at 1320 and 1322 of FIG. 13, the second UE 1204 may establish an ML inference result sharing session with the first UE 1202 by receiving/ accepting a session establishment request 1306 that includes at least one ML inference task 1308 to be performed. The establishment of the ML inference result sharing session may be performed by, e.g., the inference result sharing component 197, the cellular baseband processor 2024, and/ or the transceiver(s) 2022 of the apparatus 2004 in FIG. 20.

At 1906, the second UE may perform ML inferencing for the at least one ML inference task during the ML inference result sharing session, such as described in connection with FIGS. 12A, 12B, and 13. For example, at 1324 of FIG. 13, the second UE 1204 may perform ML inferencing for the at least one ML inference task 1308 and generate inference results 1312. The ML inferencing may be performed by, e.g., the inference result sharing component 197, the cellular baseband processor 2024, and/or the transceiver(s) 2022 of the apparatus 2004 in FIG. 20.

At 1908, the second UE may transmit, for the first UE, a set of ML inference results obtained from the ML inferencing, such as described in connection with FIGS. 12A, 12B, and 13. For example, at 1324 of FIG. 13, the second UE 1204 may transmit inference results 1312 associated with the at least one ML inference task 1308 to the first UE 1202. The transmission of the ML inference results may be performed by, e.g., the inference result sharing component 197, the cellular baseband processor 2024, and/or the transceiver(s) 2022 of the apparatus 2004 in FIG. 20.

In one example, prior to establishing the ML inference result sharing session with the first UE for at least one ML inference task, the second UE may receive a discovery message for requesting an ML inference result sharing service from the first UE, transmit a discovery response to the first UE that includes ML inference result sharing service information, and receive a pairing and ML inference sharing request from the first UE in response the discovery response, where the ML inference result sharing session is established with the first UE based on accepting the pairing and ML inference sharing request, such as described in connection with FIGS. 12A, 12B, and 13. The reception of the discovery message, the transmission of the discovery response, and/or the reception of the pairing and ML inference sharing request may be performed by, e.g., the inference result sharing component 197, the cellular baseband processor 2024, and/or the transceiver(s) 2022 of the apparatus 2004 in FIG. 20. In such an example, the ML inference result sharing service information include at least one of: an ML inference data service ID, first information of a set of features associated with one or more ML inference models at the second UE, second information associated with the one or more ML inference models, third information associated with ML inference result fusion, ML inference output formats associated with the one or more ML inference models, ML inference performances associated with the one or more ML inference models, or duration of ML inference service in which the second UE is able to provide for the one or more ML inference models. In such an example, the discovery message is a ND message, where the ND message is associated with a capability of the second UE for participating a discovery process.

In another example, the second UE may transmit a session termination notice for terminating the ML inference result sharing session to the first UE, and receive an ACK for terminating the ML inference result sharing session from the first UE, such as described in connection with FIGS. 12A, 12B, and 13. For example, at 1330 and 1332 of FIG. 13, the second UE 1204 may transmit a session termination notice 1316 to the first UE 1202, and receive a termination acknowledgement 1318 from the first UE 1202 in response to the session termination notice 1316. The transmission of the session termination notice and/or the reception of the ACK for terminating the ML inference result sharing session may be performed by, e.g., the inference result sharing component 197, the cellular baseband processor 2024, and/ or the transceiver(s) 2022 of the apparatus 2004 in FIG. 20.

In another example, to establishing the ML inference result sharing session with the first UE for the at least one ML inference task, the second UE may receive a request to establish the ML inference result sharing session from the first UE, and transmit an ACK for establishing the ML inference result sharing session to the first UE. In such an example, the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

In another example, the second UE may receive a second set of ML inference results for the at least one ML inference task from the first UE.

In another example, the first UE has a first capability for ML processing and the second UE has a second capability for ML processing, where the first capability for ML processing is lower than the second capability for ML processing.

Figure 20:
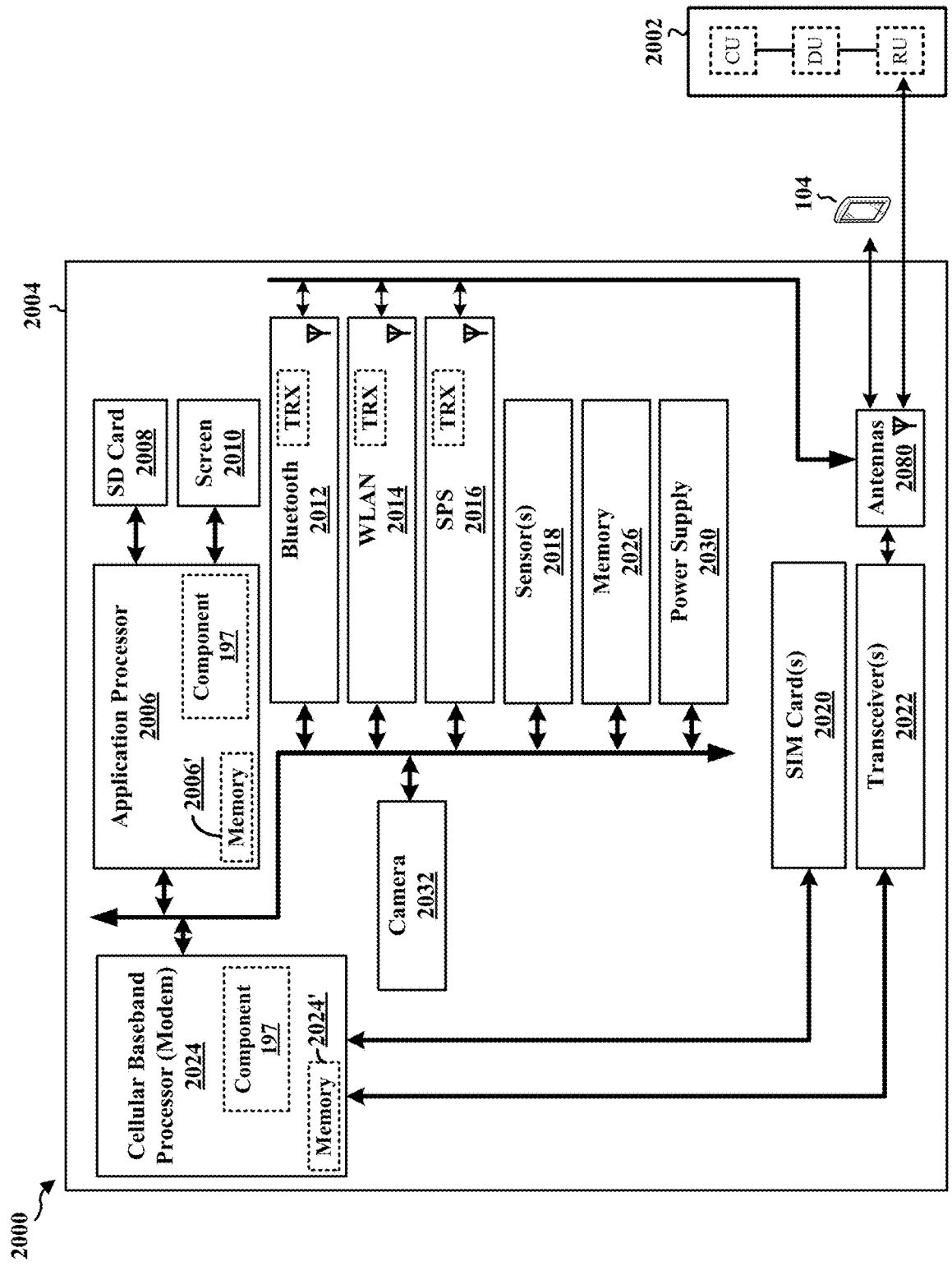
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include a cellular baseband processor 2024 (also referred to as a modem) coupled to one or more transceivers 2022 (e.g., cellular RF transceiver). The cellular baseband processor 2024 may include on-chip memory 2024'. In some aspects, the apparatus 2004 may further include one or more subscriber identity modules (SIM) cards 2020 and an application processor 2006 coupled to a secure digital (SD) card 2008 and a screen 2010. The application processor 2006 may include on-chip memory 2006'. In some aspects, the apparatus 2004 may further include a Bluetooth module 2012, a WLAN module 2014, an SPS module 2016 (e.g., GNSS module), one or more sensor modules 2018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the SPS module 2016 may include an on-chip transceiver (TRX) (or in some cases, just a receiver (RX)). The Bluetooth module 2012, the WLAN module 2014, and the SPS module 2016 may include their own dedicated antennas and/or utilize the antennas 2080 for communication. The cellular baseband processor 2024 communicates through the transceiver(s) 2022 via one or more antennas 2080 with the UE 104 and/or with an RU associated with a network entity 2002. The cellular baseband processor 2024 and the application processor 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor 2024 and the application processor 2006 are each responsible for general processing, including the execution of software stored on the computer-readable medium/memory. The software, when executed by the cellular baseband processor 2024/application processor 2006, causes the cellular baseband processor 2024/application processor 2006 to perform the various functions described supra. The computer-readable medium/memory may also be used for storing data that is manipulated by the cellular baseband processor 2024/application processor 2006 when executing software. The cellular baseband processor 2024/application processor 2006 may be a component of the UE 350 and may include the memory 360 and/or at least one of the TX processor 368, the RX processor 356, and the controller/processor 359. In one configuration, the apparatus 2004 may be a processor chip (modem and/or application) and include just the cellular baseband processor 2024 and/or the application processor 2006, and in another configuration, the apparatus 2004 may be the entire UE (e.g., see 350 of FIG. 3) and include the additional modules of the apparatus 2004.

As discussed supra, the inference result sharing component 197 is configured to establish an ML inference result sharing session with a first UE for at least one ML inference task. The inference result sharing component 197 may also be configured to perform ML inferencing for the at least one ML inference task during the ML inference result sharing session. The inference result sharing component 197 may also be configured to transmit, for the first UE, a set of ML inference results obtained from the ML inferencing. The inference result sharing component 197 may be within the cellular baseband processor 2024, the application processor 2006, or both the cellular baseband processor 2024 and the application processor 2006. The inference result sharing component 197 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2004 may include a variety of components configured for various functions. In one configuration, the apparatus 2004, and in particular the cellular baseband processor 2024 and/or the application processor 2006, includes means for establishing an ML inference result sharing session with a first UE for at least one ML inference task. The apparatus 2004 may further include means for performing ML inferencing for the at least one ML inference task during the ML inference result sharing session. The apparatus 2004 may further include means for transmitting, for the first UE, a set of ML inference results obtained from the ML inferencing.

In one configuration, the apparatus 2004 may further include means for receiving a discovery message for requesting an ML inference result sharing service from the first UE, means for transmitting a discovery response to the first UE that includes ML inference result sharing service information, and means for receiving a pairing and ML inference sharing request from the first UE in response the discovery response, where the ML inference result sharing session is established with the first UE based on accepting the pairing and ML inference sharing request. In such a configuration, the ML inference result sharing service information include at least one of: an ML inference data service ID, first information of a set of features associated with one or more ML inference models at the second UE, second information associated with the one or more ML inference models, third information associated with ML inference result fusion, ML inference output formats associated with the one or more ML inference models, ML inference performances associated with the one or more ML inference models, or duration of ML inference service in which the second UE is able to provide for the one or more ML inference models. In such a configuration, the discovery message is a ND message, where the ND message is associated with a capability of the second UE for participating a discovery process.

In another configuration, the apparatus 2004 may further include means for transmitting a session termination notice for terminating the ML inference result sharing session to the first UE, and means for receiving an ACK for terminating the ML inference result sharing session from the first UE.

In another configuration, the means for establishing the ML inference result sharing session with the first UE for the at least one ML inference task may include configuring the apparatus 2004 to receive a request to establish the ML inference result sharing session from the first UE, and transmit an ACK for establishing the ML inference result sharing session to the first UE. In such a configuration, the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

In another configuration, the apparatus 2004 may further include means for receiving a second set of ML inference results for the at least one ML inference task from the first UE.

In another configuration, the first UE has a first capability for ML processing and the second UE has a second capability for ML processing, where the first capability for ML processing is lower than the second capability for ML processing.

The means may be the inference result sharing component 197 of the apparatus 2004 configured to perform the functions recited by the means. As described supra, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE, including: establishing an ML inference result sharing session with one or more second UEs for at least one ML inference task; receiving a first set of ML inference results associated with the at least one ML inference task, where the first set of ML inference results is received from the one or more second UEs during the ML inference result sharing session; and estimating an aggregated ML inference result based on at least one of the first set of ML inference results or a second set of ML inference results, where the second set of ML inference results is configured by the first UE for the at least one ML inference task.

Aspect 2 is the method of aspect 1, where establishing the ML inference result sharing session for the at least one ML inference task with the one or more second UEs further including: transmitting a request to establish the ML inference result sharing session to the one or more second UEs; and receiving an ACK for establishing the ML inference result sharing session from the one or more second UEs.

Aspect 3 is the method of aspect 2, where the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

Aspect 4 is the method of any of aspects 1 to 3, further including: generating the second set of ML inference results prior to estimating the aggregated ML inference result, such that the aggregated ML inference result is estimated based on the generated second set of ML inference results.

Aspect 5 is the method of aspect 4, further including: transmitting an indication of the generated second set of ML inference results to the one or more second UEs.

Aspect 6 is the method of any of aspects 1 to 5, further including: receiving a session termination notice for terminating the ML inference result sharing session from the one or more second UEs; transmitting an ACK for terminating the ML inference result sharing session to the one or more second UEs; and performing ML inferencing for the at least one ML inference task without ML inference result sharing or establishing a second ML inference result sharing session for the at least one ML inference task with at least a third UE.

Aspect 7 is the method of any of aspects 1 to 6, where estimating the aggregated ML inference result includes: combining the first set of ML inference results with the second set of ML inference results.

Aspect 8 is the method of aspect 7, further including: receiving a weight or coefficient distribution from a network entity for the first set of ML inference results and the second set of ML inference results, where the first set of ML inference results and the second set of ML inference results are combined based on the weight or coefficient distribution.

Aspect 9 is the method of aspect 8, further including: transmitting information associated with the ML inference result sharing session to the network entity, where the weight or coefficient distribution is received in response to the transmitted information.

Aspect 10 is the method of any of aspects 1 to 9, where the first set of ML inference results is based on a first ML model and the second set of ML inference results is based on a second ML model that is different from the first ML model.

Aspect 11 is the method of any of aspects 1 to 10, where the first UE has a first capability for ML processing and the one or more second UEs have a second capability for ML processing, where the first capability for ML processing is lower than the second capability for ML processing.

Aspect 12 is the method of any of aspects 1 to 11, further including: transmitting a discovery message for requesting an ML inference result sharing service to a set of UEs including the one or more second UEs; receiving a discovery response from the one or more second UEs that includes ML inference result sharing service information; and transmitting a pairing and ML inference sharing request to the one or more second UEs in response the discovery response, where the ML inference result sharing session is established with the one or more second UEs based on the one or more second UEs accepting the pairing and ML inference sharing request.

Aspect 13 is the method of aspect 12, where the ML inference result sharing service information includes at least one of: an ML inference data service ID, first information of a set of features associated with one or more ML inference models at the one or more second UEs, second information associated with the one or more ML inference models, third information associated with ML inference result fusion, ML inference output formats associated with the one or more ML inference models, ML inference performances associated with the one or more ML inference models, or duration of ML inference service in which the one or more second UEs are able to provide for the one or more ML inference models.

Aspect 14 is the method of aspect 12, where the discovery message is a ND message, where the ND message is associated with a capability of the one or more second UEs for participating a discovery process.

Aspect 15 is an apparatus for wireless communication at a first UE, including: a memory; and at least one processor coupled to the memory and, based at least in part on information stored in the memory, the at least one processor is configured to implement any of aspects 1 to 14.

Aspect 16 is the apparatus of aspect 15, further including at least one of a transceiver or an antenna coupled to the at least one processor, where to receive the first set of ML inference results, the at least one processor is configured to receive the first set of ML inference results via at least one of the transceiver or the antenna.

Aspect 17 is an apparatus for wireless communication including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

Aspect 19 is a method of wireless communication at a second UE, including: establishing an ML inference result sharing session with a first UE for at least one ML inference task; performing ML inferencing for the at least one ML inference task during the ML inference result sharing session; and transmitting, for the first UE, a set of ML inference results obtained from the ML inferencing.

Aspect 20 is the method of aspect 19, where establishing the ML inference result sharing session with the first UE for the at least one ML inference task further including: receiving a request to establish the ML inference result sharing session from the first UE; and transmitting an ACK for establishing the ML inference result sharing session to the first UE.

Aspect 21 is the method of aspect 20, where the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional.

Aspect 22 is the method of any of aspects 19 to 21, further including: receiving a second set of ML inference results for the at least one ML inference task from the first UE.

Aspect 23 is the method of any of aspects 19 to 22, further including: transmitting a session termination notice for terminating the ML inference result sharing session to the first UE; and receiving an ACK for terminating the ML inference result sharing session from the first UE.

Aspect 24 is the method of any of aspects 19 to 23, where the first UE has a first capability for ML processing and the second UE has a second capability for ML processing, where the first capability for ML processing is lower than the second capability for ML processing.

Aspect 25 is the method of any of aspects 19 to 24, further including: receiving a discovery message for requesting an ML inference result sharing service from the first UE; transmitting a discovery response to the first UE that includes ML inference result sharing service information; and receiving a pairing and ML inference sharing request from the first UE in response the discovery response, where the ML inference result sharing session is established with the first UE based on accepting the pairing and ML inference sharing request.

Aspect 26 is the method of aspect 25, where the ML inference result sharing service information include at least one of: an ML inference data service ID, first information of a set of features associated with one or more ML inference models at second UE, second information associated with the one or more ML inference models, third information associated with ML inference result fusion, ML inference output formats associated with the one or more ML inference models, ML inference performances associated with the one or more ML inference models, or duration of ML inference service in which the second UE is able to provide for the one or more ML inference models.

Aspect 27 is the method of aspect 25, where the discovery message is a ND message, where the ND message is associated with a capability of the second UE for participating a discovery process.

Aspect 28 is an apparatus for wireless communication at a second UE, including: a memory; and at least one processor coupled to the memory and, based at least in part on information stored in the memory, the at least one processor is configured to implement any of aspects 19 to 27.

Aspect 29 is the apparatus of aspect 28, further including at least one of a transceiver or an antenna coupled to the at least one processor, where to transmit the set of ML inference results, the at least one processor is configured to transmit the set of ML inference results via at least one of the transceiver or the antenna.

Aspect 30 is an apparatus for wireless communication including means for implementing any of aspects 19 to 27.

Aspect 31 is a computer-readable medium (e.g., a non-transitory computer-readable medium) storing computer executable code, where the code when executed by a processor causes the processor to implement any of aspects 19 to 27.

Aspect 32 is a method of wireless communication at a network entity, including: receiving a first information associated with a first machine learning (ML) model and second information associated with a second ML model from at least one of a first UE or a second UE; determining weights or coefficients for combining ML inference results generated from the first ML model and the second ML model; and transmit the weights or the coefficients to at least one of the first UE or the second UE.

Aspect 33 is the method of aspect 32, where the first ML model is associated with the first UE and the second ML model is associated with the second UE, the first ML model being different from the second ML model.

Aspect 34 is the method of aspect 32 or aspect 33, further including: storing, looking up, selecting, or distributing the weights or the coefficients to one or more UEs.

Aspect 35 is the method of any of aspects 32 to 34, where the weights or the coefficients is determined based on a device type of the first UE or the second UE, a model type of the first ML model or the second ML model, a position of the first UE or the second UE, a mobility of the first UE or the second UE, or a combination thereof.

Aspect 36 is the method of any of aspects 32 to 35, where the network entity corresponds to a base station, a component of the base station, a RIC in an O-RAN architecture, an AI/ML entity, or a function at a RAN or a core network.

Aspect 37 is an apparatus for wireless communication at a network entity, including: a memory; and at least one processor coupled to the memory and, based at least in part on information stored in the memory, the at least one processor is configured to implement any of aspects 32 to 36.

Aspect 38 is the apparatus of aspect 28, further including at least one of a transceiver or an antenna coupled to the at least one processor, where to transmit the weights or the coefficients, the at least one processor is configured to transmit the weights or the coefficients via at least one of the transceiver or the antenna.

Aspect 39 is an apparatus for wireless communication including means for implementing any of aspects 32 to 36.

Aspect 40 is a computer-readable medium (e.g., a non-transitory computer-readable medium) storing computer executable code, where the code when executed by a processor causes the processor to implement any of aspects 32 to 36.

What is claimed is:

1. An apparatus for wireless communication at a first user equipment (UE), comprising:
   a memory; and
   at least one processor coupled to the memory and, based at least in part on information stored in the memory, the at least one processor is configured to:
   establish a machine learning (ML) inference result sharing session with one or more second UEs for at least one ML inference task;
   receive a first set of ML inference results associated with the at least one ML inference task, wherein the first set of ML inference results is received from the one or more second UEs during the ML inference result sharing session; and
   estimate an aggregated ML inference result based on at least one of the first set of ML inference results or a second set of ML inference results, wherein the second set of ML inference results is configured by the first UE for the at least one ML inference task.

2. The apparatus of claim 1, wherein to establish the ML inference result sharing session for the at least one ML inference task with the one or more second UEs, the at least one processor is configured to:
   transmit a request to establish the ML inference result sharing session to the one or more second UEs; and
   receive an acknowledgement (ACK) for establishing the ML inference result sharing session from the one or more second UEs.

3. The apparatus of claim 2, wherein the request includes at least one of:
   the at least one ML inference task to be performed,
   a format for the first set of ML inference result,
   a duration for the ML inference result sharing session,
   a frequency for receiving the first set of ML inference result, or
   an indication of whether the ML inference result sharing session is uni-directional or bidirectional.

4. The apparatus of claim 1, wherein the at least one processor is further configured to:
   generate the second set of ML inference results prior to estimating the aggregated ML inference result, such that the aggregated ML inference result is estimated based on the generated second set of ML inference results.

5. The apparatus of claim 4, wherein the at least one processor is further configured to:
   transmit an indication of the generated second set of ML inference results to the one or more second UEs.

6. The apparatus of claim 1, wherein the at least one processor is further configured to:
   receive a session termination notice for terminating the ML inference result sharing session from the one or more second UEs;
   transmit an acknowledgement (ACK) for terminating the ML inference result sharing session to the one or more second UEs; and
   perform ML inferencing for the at least one ML inference task without ML inference result sharing or establish a second ML inference result sharing session for the at least one ML inference task with at least a third UE.

7. The apparatus of claim 1, wherein to estimate the aggregated ML inference result, the at least one processor is configured to: combine the first set of ML inference results with the second set of ML inference results.

8. The apparatus of claim 7, wherein the at least one processor is further configured to:
   receive a weight or coefficient distribution from a network entity for the first set of ML inference results and the second set of ML inference results, wherein the first set of ML inference results and the second set of ML inference results are combined based on the weight or coefficient distribution.

9. The apparatus of claim 8, wherein the at least one processor is further configured to:
   transmit first information associated with the ML inference result sharing session to the network entity, wherein the weight or coefficient distribution is received in response to the transmitted first information.

10. The apparatus of claim 1, wherein the first set of ML inference results is based on a first ML model and the second set of ML inference results is based on a second ML model that is different from the first ML model.

11. The apparatus of claim 1, wherein the first UE has a first capability for ML processing and the one or more second UEs have a second capability for ML processing, wherein the first capability for ML processing is lower than the second capability for ML processing.

12. The apparatus of claim 1, wherein the at least one processor is further configured to:
    transmit a discovery message for requesting an ML inference result sharing service to a set of UEs including the one or more second UEs;
    receive a discovery response from the one or more second UEs that includes ML inference result sharing service information; and
    transmit a pairing and ML inference sharing request to the one or more second UEs in response the discovery response,
    wherein the ML inference result sharing session is established with the one or more second UEs based on the one or more second UEs accepting the pairing and ML inference sharing request.

13. The apparatus of claim 12, wherein the ML inference result sharing service information includes at least one of:
    an ML inference data service identification (ID), first information of a set of features associated with one or more ML inference models at the one or more second UEs,
second information associated with the one or more ML inference models,
third information associated with ML inference result fusion,
ML inference output formats associated with the one or more ML inference models,
ML inference performances associated with the one or more ML inference models, or
duration of ML inference service in which the one or more second UEs are able to provide for the one or more ML inference models.

14. The apparatus of claim 12, wherein the discovery message is a neighboring discovery (ND) message, wherein the ND message is associated with a capability of the one or more second UEs for participating a discovery process, further comprising at least one of a transceiver or an antenna coupled to the at least one processor, wherein to receive the first set of ML inference results, the at least one processor is configured to receive the first set of ML inference results via at least one of the transceiver or the antenna.

15. A method of wireless communication at a first user equipment (UE), comprising:
establishing a machine learning (ML) inference result sharing session with one or more second UEs for at least one ML inference task;
receiving a first set of ML inference results associated with the at least one ML inference task, wherein the first set of ML inference results is received from the one or more second UEs during the ML inference result sharing session; and
estimating an aggregated ML inference result based on at least one of the first set of ML inference results or a second set of ML inference results, wherein the second set of ML inference results is configured by the first UE for the at least one ML inference task.

16. The method of claim 15, wherein establishing the ML inference result sharing session for the at least one ML inference task with the one or more second UEs comprising:
transmitting a request to establish the ML inference result sharing session to the one or more second UEs, wherein the request includes at least one of: the at least one ML inference task to be performed, a format for the first set of ML inference result, a duration for the ML inference result sharing session, a frequency for receiving the first set of ML inference result, or an indication of whether the ML inference result sharing session is uni-directional or bidirectional; and
receiving an acknowledgement (ACK) for establishing the ML inference result sharing session from the one or more second UEs.

17. The method of claim 15, further comprising:
generating the second set of ML inference results prior to estimating the aggregated ML inference result, such that the aggregated ML inference result is estimated based on the generated second set of ML inference results.

18. The method of claim 15, further comprising:
receiving a session termination notice for terminating the ML inference result sharing session from the one or more second UEs;
transmitting an acknowledgement (ACK) for terminating the ML inference result sharing session to the one or more second UEs; and
performing ML inferencing for the at least one ML inference task without ML inference result sharing or establishing a second ML inference result sharing session for the at least one ML inference task with at least a third UE.

19. The method of claim 15, wherein estimating the aggregated ML inference result comprises combining the first set of ML inference results with the second set of ML inference results, the method further comprising:
receiving a weight or coefficient distribution from a network entity for the first set of ML inference results and the second set of ML inference results, wherein the first set of ML inference results and the second set of ML inference results are combined based on the weight or coefficient distribution.

20. The method of claim 15, further comprising:
transmitting a discovery message for requesting an ML inference result sharing service to a set of UEs including the one or more second UEs;
receiving a discovery response from the one or more second UEs that includes ML inference result sharing service information; and
transmitting a pairing and ML inference sharing request to the one or more second UEs in response the discovery response,
wherein the ML inference result sharing session is established with the one or more second UEs based on the one or more second UEs accepting the pairing and ML inference sharing request, wherein the ML inference result sharing service information include at least one of: an ML inference data service identification (ID), first information of a set of features associated with one or more ML inference models at the one or more second UEs, second information associated with the one or more ML inference models, third information associated with ML inference result fusion, ML inference output formats associated with the one or more ML inference models, ML inference performances associated with the one or more ML inference models, or duration of ML inference service in which the one or more second UEs are able to provide for the one or more ML inference models.

21. An apparatus for wireless communication at a second user equipment (UE), comprising:
a memory; and
at least one processor coupled to the memory and, based at least in part on information stored in the memory, the at least one processor is configured to:
establish a machine learning (ML) inference result sharing session with a first UE for at least one ML inference task;
perform ML inferencing for the at least one ML inference task during the ML inference result sharing session; and
transmit, for the first UE, a set of ML inference results obtained from the ML inferencing.

22. The apparatus of claim 21, wherein to establish the ML inference result sharing session with the first UE for the at least one ML inference task, the at least one processor is configured to:
receive a request to establish the ML inference result sharing session from the first UE; and
transmit an acknowledgement (ACK) for establishing the ML inference result sharing session to the first UE.

23. The apparatus of claim 22, wherein the request includes at least one of:
- the at least one ML inference task to be performed,
- a format for the first set of ML inference result,
- a duration for the ML inference result sharing session,
- a frequency for receiving the first set of ML inference result, or
- an indication of whether the ML inference result sharing session is uni-directional or bidirectional.

24. The apparatus of claim 21, wherein the at least one processor is further configured to:
- receive a second set of ML inference results for the at least one ML inference task from the first UE.

25. The apparatus of claim 21, wherein the at least one processor is further configured to:
- transmit a session termination notice for terminating the ML inference result sharing session to the first UE; and
- receive an acknowledgement (ACK) for terminating the ML inference result sharing session from the first UE.

26. The apparatus of claim 21, wherein the first UE has a first capability for ML processing and the second UE has a second capability for ML processing, wherein the first capability for ML processing is lower than the second capability for ML processing.

27. The apparatus of claim 21, wherein the at least one processor is further configured to:
- receive a discovery message for requesting an ML inference result sharing service from the first UE;
- transmit a discovery response to the first UE that includes ML inference result sharing service information; and
- receive a pairing and ML inference sharing request from the first UE in response the discovery response,
- wherein the ML inference result sharing session is established with the first UE based on accepting the pairing and ML inference sharing request.

28. The apparatus of claim 27, wherein the ML inference result sharing service information includes at least one of:
- an ML inference data service identification (ID),
- first information of a set of features associated with one or more ML inference models at the second UE,
- second information associated with the one or more ML inference models,
- third information associated with ML inference result fusion,
- ML inference output formats associated with the one or more ML inference models,
- ML inference performances associated with the one or more ML inference models, or
- duration of ML inference service in which the second UE is able to provide for the one or more ML inference models.

29. The apparatus of claim 27, wherein the discovery message is a neighboring discovery (ND) message, wherein the ND message is associated with a capability of the second UE for participating a discovery process, further comprising at least one of a transceiver or an antenna coupled to the at least one processor, wherein to transmit the set of ML inference results, the at least one processor is configured to transmit the set of ML inference results via at least one of the transceiver or the antenna.

30. A method of wireless communication at a second user equipment (UE), comprising:
- establishing a machine learning (ML) inference result sharing session with a first UE for at least one ML inference task;
- performing ML inferencing for the at least one ML inference task during the ML inference result sharing session; and
- transmitting, for the first UE, a set of ML inference results obtained from the ML inferencing.

* * * * *